United States Patent
Kayahara et al.

(10) Patent No.: US 7,931,602 B2
(45) Date of Patent: Apr. 26, 2011

(54) GAZE GUIDANCE DEGREE CALCULATION SYSTEM, GAZE GUIDANCE DEGREE CALCULATION PROGRAM, STORAGE MEDIUM, AND GAZE GUIDANCE DEGREE CALCULATION METHOD

(75) Inventors: Naoki Kayahara, Chino (JP); Satoshi Yamada, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 1799 days.

(21) Appl. No.: 11/087,033

(22) Filed: Mar. 23, 2005

(65) Prior Publication Data
US 2005/0234323 A1 Oct. 20, 2005

(30) Foreign Application Priority Data

Mar. 24, 2004 (JP) ................................ 2004-087101
Nov. 26, 2004 (JP) ................................ 2004-342370

(51) Int. Cl.
- *A61B 13/00* (2006.01)
- *A61B 5/103* (2006.01)
- *A61B 5/117* (2006.01)

(52) U.S. Cl. .................... 600/558; 600/587; 600/595

(58) Field of Classification Search ............... 600/558, 600/587, 595; 351/209, 224; 340/471
See application file for complete search history.

(56) References Cited

U.S. PATENT DOCUMENTS

| | | | |
|---|---|---|---|
| 5,231,674 A * | 7/1993 | Cleveland et al. | 382/117 |
| 5,692,008 A * | 11/1997 | Van Nee | 375/148 |
| 5,742,264 A * | 4/1998 | Inagaki et al. | 345/8 |
| 5,757,963 A * | 5/1998 | Ozaki et al. | 382/209 |
| 5,758,201 A * | 5/1998 | Watanabe et al. | 396/51 |
| 5,983,029 A * | 11/1999 | Yamada et al. | 396/51 |
| 6,516,154 B1 * | 2/2003 | Parulski et al. | 396/287 |
| 6,601,021 B2 * | 7/2003 | Card et al. | 702/187 |
| 6,700,578 B2 * | 3/2004 | Kamata et al. | 345/473 |
| 6,714,198 B2 * | 3/2004 | Kamata et al. | 345/427 |
| 6,762,789 B1 * | 7/2004 | Sogabe et al. | 348/36 |
| 6,774,900 B1 * | 8/2004 | Kubota et al. | 345/473 |
| 6,934,415 B2 * | 8/2005 | Stentiford | 382/205 |
| 2004/0013302 A1 * | 1/2004 | Ma et al. | 382/209 |
| 2005/0069206 A1 * | 3/2005 | Ma et al. | 382/190 |
| 2005/0084136 A1 * | 4/2005 | Xie et al. | 382/107 |

FOREIGN PATENT DOCUMENTS

| | | |
|---|---|---|
| JP | A 6-162 | 1/1994 |
| JP | A 2001-126070 | 5/2001 |

* cited by examiner

*Primary Examiner* — Jeffrey G Hoekstra
(74) *Attorney, Agent, or Firm* — Oliff & Berridge, PLC

(57) ABSTRACT

Exemplary embodiments of the invention provide a gaze guidance degree calculation system capable of implementing a compact and low-cost apparatus and surely obtaining a proper eye-flow. According to exemplary embodiments, a layout apparatus where a layout image is segmented into a plurality of regions, and positions of representative regions of the specific regions and gaze attraction strength indicating strength of gaze-attraction to the specific regions are calculated. Next, a plurality of the specific regions in the layout image are set by using a starting point as a reference, and gaze guidance strength indicating a degree of gaze-guidance from the starting point to the specific regions is generated based on the gaze-attraction strength of the representative points in the specific regions.

10 Claims, 30 Drawing Sheets

|    | x  | y  | z=f( ) |
|----|----|----|--------|
| Pa | 10 | 5  | 0.9    |
| Pb | 5  | 15 | 0.6    |
| Pc | 15 | 10 | 0.4    |
| Pd | 15 | 25 | 0.3    |

FIG. 27

|    | Pa       | Pb       | Pc       | Pd       |
|----|----------|----------|----------|----------|
| Pa | 0        | 11.18034 | 7.071068 | 20.61553 |
| Pb | 11.18034 | 0        | 11.18034 | 14.14214 |
| Pc | 7.071068 | 11.18034 | 0        | 15       |
| Pd | 20.61553 | 14.14214 | 15       | 0        |

FIG. 28

| VECTOR | DIRECTION | MAGNITUDE |
|--------|-----------|-----------|
| $\overrightarrow{Pab}$ | (-5, 10) | 11.18034 |
| $\overrightarrow{Pac}$ | (5, 5)   | 7.071068 |
| $\overrightarrow{Pad}$ | (5, 20)  | 20.61553 |

| SPECIFIC REGION | GAZE GUIDANCE DIRECTION | GAZE GUIDANCE STRENGTH |
|---|---|---|
| a | (0, 0) | 0 |
| b | (0, 0) | 0 |
| c | (−5, 10) | 11.18 |
| d | (10, 25) | 26.93 |

FIG. 32

| VECTOR | DIRECTION (BEFORE NORMALIZATION) | MAGNITUDE |
|---|---|---|
| $\vec{Pab}$ | (-5, 10) | 0.6 |
| $\vec{Pac}$ | (5, 5) | 0.4 |
| $\vec{Pad}$ | (5, 20) | 0.3 |

FIG. 33

| VECTOR | DIRECTION (BEFORE NORMALIZATION) | MAGNITUDE |
|---|---|---|
| $\vec{Pab}$ | (-5, 10) | 6 |
| $\vec{Pac}$ | (5, 5) | 4 |
| $\vec{Pad}$ | (5, 20) | 3 |

FIG. 34

| VECTOR | GAZE GUIDANCE DEGREE (AFTER NORMALIZATION) | GAZE GUIDANCE STRENGTH |
|---|---|---|
| $\vec{Pab}$ | (-2.7, 5.4) | 6 |
| $\vec{Pac}$ | (2.8, 2.8) | 4 |
| $\vec{Pad}$ | (0.7, 2.9) | 3 |

| SPECIFIC REGION | GAZE GUIDANCE DIRECTION | GAZE GUIDANCE STRENGTH |
|---|---|---|
| a | (0, 0) | 0 |
| b | (0, 0) | 0 |
| c | (-2.7, 5.4) | 6 |
| d | (3.5, 5.7) | 6.9 |

GAZE GUIDANCE DEGREE CALCULATION SYSTEM, GAZE GUIDANCE DEGREE CALCULATION PROGRAM, STORAGE MEDIUM, AND GAZE GUIDANCE DEGREE CALCULATION METHOD

BACKGROUND

Exemplary embodiments of the present invention relate to a system for calculating a degree of gaze-guidance of an image, a program and method thereof. Further, exemplary embodiments provide a gaze guidance degree calculation system, a gaze guidance degree calculation program, a storage medium, and a gaze guidance degree calculation method capable of implementing a compact and low-cost apparatus to obtain a proper eye-flow.

Visual documents are well-designed documents such as catalogs for goods in which layout elements such as titles, images, and texts are arranged to be easily recognized. Since a lot of design know-how is needed to make the visual documents, it is difficult for ordinary businessman to make the visual documents. For that reason, in many cases, a designer having special technologies is entrusted with the task of making the visual documents.

When the designer makes the visual documents, the designer disposes contextually-related layout elements along the direction (hereinafter, referred to as an eye-flow) of a reader's eye-flow in mind to implement easily-readable layout. For example, if a news article comprises a title, images, and texts, it is preferable that the title, images, and texts are arranged along the eye-flow. Therefore, after the layout elements are arranged, the designer re-arranges the layout elements along the expected eye-flow in order to obtain easily-readable layout by trial and error. However, since the designer relies on his/her sense of design and experience for the eye-flow, it is difficult to quantitatively acquire the eye-flow.

The related art includes techniques for acquiring the eye-flow and related techniques. There are a visual information analyzing apparatus disclosed in the related art Document Japanese Unexamined Patent Application Publication No. Heisei 6-162, an attraction region extraction apparatus disclosed in related art Document Japanese Unexamined Patent Application Publication No. 2001-126070, and an attractiveness estimation model disclosed in related art Document "A Figure Extraction Method Using the Color and Texture Contrasts of Image Regions as Feature Amount" by Shoji Tanaka, Seiji Inokuchi, Yuichi Iwadate, and Ryohei Nakatsu, in the Information Processing Society, Vol. 40, No. 8, 1999, (hereinafter "Tanaka").

In the invention described in related art Document Japanese Unexamined Patent Application Publication No. Heisei 6-162, time-series change of eyeballs detected by the analyzing apparatus is analyzed in a frequency domain, contents of an image input from an image input unit are analyzed by a display-contents analyzing apparatus, and the both results are integrated and processed by an integration analyzing unit, so that highly-reliable data on a mental state of a tested person and the objective estimation of the image can be obtained.

The invention descried in the related art Document Japanese Unexamined Patent Application Publication No. 2001-126070 includes an attention region extraction apparatus, an image generation apparatus, and a figure-composition cutting apparatus. The image generation apparatus generates a current image, that is, a panorama image from a picture taken by a camera. The attention region extraction apparatus extracts an attention region from an original image supplied from the image generation apparatus. Estimation is made by a human subjectivity according to physical features of the original image, and the attention region is extracted as a result of the estimation. In the figure-composition cutting apparatus, the extracted attention region and adjacent image regions thereof are cut off from the original image with reference to data on paintings drawn by painters or pictures taken by photographers, which is stored in a memory. As a result, the attention region having the same picture-composition as that of the image of paintings and pictures can be cut off.

In Tanaka, a concept of attractiveness introduced in the invention described in related art Document Japanese Unexamined Patent Application Publication No. 2001-126070 and a detailed calculation method thereof are descried in detail.

SUMMARY

However, since the eye-flow is detected by using an apparatus such as an eye camera in the invention described in related art Document Japanese Unexamined Patent Application Publication No. Heisei 6-162, there is a problem in that a large-sized and high-cost apparatus is needed. In addition, in a case where a designer makes layout while detecting his or her eye-flow by using the invention of related art Document Japanese Unexamined Patent Application Publication No. Heisei 6-162, since similar layout results are repeatedly seen, the designer may be familiar with the similar layout results or may take his or her expected eye-flow, so that the eye-flow first seen by a third party may not be coincident with the his or her actually detected eye-flow. Since the designer's intention is to provide an easily-readable layout to readers who see the layout result for the first time, the designer must obtain the eye-flow with which the reader sees the layout result for the first time. Therefore, even though the designer makes a layout while detecting his or her eye-flow, there is another problem in that it is difficult to obtain a proper eye-flow and to implement an easily-readable layout.

In addition, in the invention of the related art Document Japanese Unexamined Patent Application Publication No. Heisei 6-162, a "learning" operation is performed on image feature amounts extracted from images of the visual documents and gaze feature amounts of eye movement detected by using an instrument when the images are shown to the testing person. Next, after the learning results are accumulated, if only the image feature amount is applied, the gaze feature amount can be estimated based on the applied image feature amount and the learning results.

Since the "learning" method is employed, if the applied image feature amount results from the complete learning operation, a proper eye-flow can be obtained. However, if the learning operation is not completed, any proper eye-flow cannot be obtained. Therefore, there is another problem in that, if a large number of the learning operations are not repeated, a sufficiently reliable eye-flow cannot be obtained.

In addition, in the inventions described in the related art Document Japanese Unexamined Patent Application Publication No. Heisei 6-162 and Tanaka, since the attention region is extracted from the inter regions of the image, an estimation that gaze is easily guided to the attention region may be made based on the extraction result. However, if a plurality of attention regions exist in the image, the eye-flow cannot be obtained only by the extraction of the attention regions. In other words, it is difficult to determine a degree of gaze-guidance among the attention regions.

Exemplary embodiments of the present invention is contrived in consideration of the aforementioned and/or problems in the related art techniques. An object of the present invention is to provide a gaze guidance degree calculation system, a gaze guidance degree calculation program, a storage medium, and a gaze guidance degree calculation method capable of implementing a compact and low-cost apparatus and surely obtaining a proper eye-flow.

When layout elements arranged in a layout region are selected as attention regions, the degrees of gaze-guidance between the attention regions can be obtained. Further, when an image including a plurality of the attention regions is observed, the gaze can be easily guided to the attention region having the largest strength (hereinafter, referred to as gaze attraction strength) of gaze-attraction catching human senses for the first time. Further, the guiding order of the gaze could be progressively changed from the attention region having the largest gaze attraction strength to the attention region having a small gaze attraction strength. Therefore, it was contrived that a gaze guidance path passing through the attention regions in descending order of the gaze attraction strength thereof was formed to obtain the formed gaze guidance path as the eye flow.

However, there is a case where, first, second, third, and fourth attention regions are arranged in the descending order of the gaze attraction strength thereof, the second attention region exists in a predetermined direction seen from the first attention region, and the third and fourth regions exist in a predetermined direction deviating at a predetermined angle from the predetermined direction seen from the first attention region. In this case, the gaze is not necessarily guided according to the order of the first, second, third, and fourth regions. In some cases, the gaze may be guided in an order of the first, third, fourth, and second regions.

By scrutinizing the phenomena, the gaze is not simply guided in the descending order of the gaze attraction strength and, if a plurality of the attention regions exist in a predetermined direction, the gaze attraction strength of the plurality of the attention regions are increasingly operative. Therefore, a proper eye flow can be obtained with consideration of positions of the attention regions as well as the gaze attraction strength of the attention regions.

[Exemplary Aspect 1]

In order to address or achieve the aforementioned object, a gaze guidance degree calculation system according to Exemplary Aspect 1 of the present invention is a gaze guidance degree calculation system to calculate a degree of gaze-guidance of an image based on a position of a representative point of an object contained in the image and gaze attraction strength indicating strength of gaze-attraction to the object, a gaze guidance degree indicating a degree of gaze-guidance of the image from a predetermined starting point being calculated based on the gaze attraction strength of the representative point in a specific region of the image.

According to the construction, the gaze guidance degree indicating a degree of gaze-guidance of the image from the predetermined starting point is calculated based on the gaze attraction strength of the representative point in the specific region of the image.

Accordingly, a direction in which gaze is easily guided in the image can be quantitatively calculated independent of subjectivity of designers or other editors. In addition, since the gaze guidance degree is calculated based on the positions of the representative points as well as the gaze attraction strength, a degree of gaze-guidance from the starting point can be relatively properly calculated. Therefore, it is possible to obtain an effect that a relatively proper eye-flow can be quantitatively obtained in comparison to related art techniques.

In addition, since it is not necessary to install an additional device such as an eye camera, the apparatus is neither oversized nor expensive, it is possible to obtain an effect that a compact and low-cost apparatus can be implemented in comparison to a related art apparatus.

In addition, since the gaze guidance degree is not generated by such a "learning" method, it is possible to obtain an effect that a proper eye-flow can be relatively surely obtained.

Here, the system may be implemented with a single apparatus, a terminal, or other apparatus, or with a network system of communicably connecting a plurality of apparatus, terminals or other apparatuses. In the latter case, the components communicably connecting each other may be included in any one of the plurality of the apparatuses. The same description is available to the gaze guidance degree calculation system according to Exemplary Aspects 2, 12, and 13 described below.

In addition, the representative point denotes a point, which is considered to be important, among arbitrary points in the interior and at the boundary of the object. For example, in a case where the object has a shape of rectangle or other polygons, a vertex, central point, or center of gravity may be selected as the representative point. In a case where the object is a circle, an ellipse, or a regions having curved contour, a central point or center of gravity may be selected as the representative point. The same description is available to the gaze guidance degree calculation system according to Exemplary Aspects 2, 12, and 13, the gaze guidance degree calculation program according to Exemplary Aspects 14, 15, 25 and 26, the storage medium according to Exemplary Aspects 27, 28, 38 and 39, and the gaze guidance degree calculation method according to Exemplary Aspects 40 or 43, 53 and 54 described below.

[Exemplary Aspect 2]

In addition, a gaze guidance degree calculation system according to Exemplary Aspect 2 of the present invention is a gaze guidance degree calculation system to calculate a degree of gaze-guidance of an image based on image data, including: a representative-point position acquisition device to acquire a position of a representative point of an object contained in the image; a gaze attraction strength acquisition device to acquire gaze attraction strength indicating strength of gaze-attraction to the object; and a gaze guidance degree calculation device to calculate a gaze guidance degree indicating a degree of gaze-guidance of the image from a predetermined starting point based on the position of the representative point acquired by the representative-point position acquisition device and the gaze attraction strength acquired by the gaze attraction strength acquisition device, wherein the gaze guidance degree calculation device calculates the gaze guidance degree based on the gaze attraction strength of the representative point in a specific region of the image.

According to the construction, the position of the representative point is acquired by the representative-point position acquisition device, and the gaze attraction strength is calculated by the gaze attraction strength acquisition device. Next, the gaze guidance degree indicating a degree of gaze-guidance of the image from the predetermined starting point is calculated based on the gaze attraction strength in the specific region of the image by the gaze guidance degree calculation device.

Accordingly, a direction in which gaze is easily guided in the image can be quantitatively calculated independent of subjectivity of designers or other editors. In addition, since the gaze guidance degree is calculated based on the positions of the representative points as well as the gaze attraction strength, a degree of gaze-guidance from the starting point can be relatively properly calculated. Therefore, it is possible to obtain an effect that a relatively proper eye-flow can be quantitatively obtained in comparison to related art techniques.

In addition, since it is not necessary to install an additional device such as an eye camera, the apparatus is neither oversized nor expensive, it is possible to obtain an effect that a compact and low-cost apparatus can be implemented in comparison to a related art apparatus.

In addition, since the gaze guidance degree is not generated by such a "learning" method, it is possible to obtain an effect that a proper eye-flow can be relatively surely obtained.

Here, as the representative-point position acquisition device, any constructions which can acquire the position of the representative point may be employed. For example, the position of the representative point may be input by such an input unit. In addition, the position of the representative point may be acquired from such an external terminal. Otherwise, the position of the representative point may be calculated based on image data. In other words, the acquisition operation includes at least one of inputting, acquisition, and calculation operations.

In addition, as the gaze attraction strength acquisition device, any constructions which can acquire the gaze attraction strength may be employed. For example, the gaze attraction strength may be input by such an input unit. In addition, the gaze attraction strength may be acquired from such an external terminal. Otherwise, the gaze attraction strength may be calculated based on image data. In other words, the acquisition operation includes at least one of inputting, acquisition, and calculation operations.

[Exemplary Aspect 3]

In addition, a gaze guidance degree calculation system according to Exemplary Aspect 3 of the present invention is a gaze guidance degree calculation system according to Exemplary Aspect 2 which further includes specific region setting device for setting the specific region based on a position of the starting point, wherein the gaze guidance degree calculation device calculates the gaze guidance degree based on the gaze attraction strength of the representative point in the specific region set by the specific region setting device.

According to the construction, by the gaze guidance degree calculation device, the gaze guidance degree is calculated based on the gaze attraction strength of the representative point in the specific region set by the specific region setting device.

Accordingly, since the specific regions are set based on the position of the starting point, it is possible to obtain an effect that a degree of gaze-guidance from the starting point can be further properly calculated.

[Exemplary Aspect 4]

In addition, a gaze guidance degree calculation system according to Exemplary Aspect 4 of the present invention is a gaze guidance degree calculation system according to Exemplary Aspect 3, the specific region setting device setting a region surrounded by straight lines, curved lines, arcs, or other segmented lines or a region surrounded by rectangle, circle, ellipse or a geometrical shape as the specific region.

According to the construction, by the specific region setting device, the region surrounded by straight lines, curved lines, arcs, or other segmented lines or a region surrounded by rectangle, circle, ellipse or a geometrical shape is set as the specific region.

Accordingly, it is possible to obtain an effect that the specific regions can be relatively easily calculated.

[Exemplary Aspect 5]

In addition, a gaze guidance degree calculation system according to Exemplary Aspect 5 of the present invention is a gaze guidance degree calculation system according to any one of Exemplary Aspects 2 to 4, the gaze guidance degree calculation device including: gaze guidance direction calculation device to calculate gaze guidance direction indicating a direction of gaze-guidance from the starting point to the specific region; and a gaze guidance strength calculation device to calculate gaze guidance strength indicating strength of gaze-guidance from the starting point to the specific region. The gaze guidance strength calculation device calculating the gaze guidance direction and the gaze guidance strength as the gaze guidance degree.

According to the construction, the gaze guidance direction indicating a direction of gaze-guidance from the starting point to the specific region is calculated by the gaze guidance direction calculation device, and the gaze guidance strength indicating strength of gaze-guidance from the starting point to the specific region is calculated by the gaze guidance strength calculation device. Next, the gaze guidance direction and the gaze guidance strength are calculated as the gaze guidance degree.

In case of using the starting point as a reference, the gaze can be easily guided with a predetermined size in the predetermined direction from the starting point. Accordingly, by calculating the gaze guidance direction and the gaze guidance strength, it is possible to obtain an effect that a degree of gaze-guidance can be further accurately calculated.

[Exemplary Aspect 6]

In addition, a gaze guidance degree calculation system according to Exemplary Aspect 6 of the present invention is a gaze guidance degree calculation system according to Exemplary Aspect 5, the gaze guidance direction calculation device calculating a predetermined direction from the starting point as the gaze guidance direction.

According to the construction, by the gaze guidance direction calculation device, the predetermined direction from the starting point is calculated as the gaze guidance direction.

Accordingly, it is possible to obtain an effect that the gaze guidance direction can be relatively easily calculated.

[Exemplary Aspect 7]

In addition, a gaze guidance degree calculation system according to Exemplary Aspect 7 of the present invention is a gaze guidance degree calculation system according to Exemplary Aspect 5, the gaze guidance direction calculation device calculating the gaze guidance direction based on the position of the starting point and the position of the representative point in the specific region.

According to the construction, by the gaze guidance direction calculation device, the gaze guidance direction is calculated based on the position of the starting point and the position of the representative point in the specific region.

Accordingly, it is possible to obtain an effect that the gaze guidance direction can be relatively reasonably calculated.

[Exemplary Aspect 8]

In addition, a gaze guidance degree calculation system according to Exemplary Aspect 8 of the present invention is a gaze guidance degree calculation system according to Exemplary Aspect 5, a plurality of the representative points existing in the specific region, and the gaze guidance direction calculation device calculating the gaze guidance direction based on a statistical value of gaze attraction strength of the representative points.

According to the construction, in a case where a plurality of the representative points exist in the specific region, by the gaze guidance direction calculation device, the gaze guidance direction is calculated based on a statistical value of gaze attraction strength of the representative points.

Accordingly, since the gaze guidance direction is calculated with consideration of the gaze guidance strength of a plurality of the representative points in the specific regions, it is possible to obtain an effect that the gaze guidance direction can be relatively reasonably calculated.

[Exemplary Aspect 9]

In addition, a gaze guidance degree calculation system according to Exemplary Aspect 9 of the present invention is a gaze guidance degree calculation system according to any one of Exemplary Aspects 5 to 8, the gaze guidance strength calculation device calculating the gaze guidance strength based on the gaze attraction strength of the representative point in the specific region.

According to the construction, by the gaze guidance strength calculation device, the gaze guidance strength is calculated based on the gaze attraction strength of the representative point in the specific region.

Accordingly, it is possible to obtain an effect that the gaze guidance strength can be relatively reasonably calculated.

[Exemplary Aspect 10]

In addition, a gaze guidance degree calculation system according to Exemplary Aspect 10 of the present invention is a gaze guidance degree calculation system according to Exemplary Aspect 9, a plurality of the representative points existing in the specific region, and the gaze guidance strength calculation device calculating the gaze guidance strength based on statistical values of positions and gaze attraction strength of the representative points.

According to the construction, in a case where a plurality of the representative points exist in the specific region, by the gaze guidance strength calculation device, the gaze guidance strength is calculated based on statistical values of positions and gaze attraction strength of the representative points.

Accordingly, since the gaze guidance strength is calculated with consideration of the positions and gaze guidance strength of the plurality of the representative point in the specific region, it is possible to obtain an effect that the gaze guidance strength can be relatively reasonably calculated.

[Exemplary Aspect 11]

In addition, a gaze guidance degree calculation system according to Exemplary Aspect 11 of the present invention is a gaze guidance degree calculation system according to any one of Exemplary Aspects 5 to 10, wherein the gaze guidance degree calculation device calculates the gaze guidance directions and the gaze guidance strength corresponding to a plurality of the specific regions of the image, and wherein the gaze guidance degree calculation device calculates the calculated gaze guidance directions and gaze attraction strength of the specific regions as the gaze guidance degrees thereof.

According to the construction, by the gaze guidance degree calculation device, the gaze guidance directions and the gaze guidance strength are calculated corresponding to a plurality of the specific regions, and the calculated gaze guidance directions and gaze attraction strength of the specific regions are calculated as the gaze guidance degrees.

Accordingly, it is possible to obtain an effect that degrees of gaze-guidance from the starting point to the specific regions can be further properly calculated in the specific regions.

[Exemplary Aspect 12]

In addition, a gaze guidance degree calculation system according to Exemplary Aspect 12 of the present invention is a gaze guidance degree calculation system to calculate a degree of gaze-guidance of an image based on positions of representative points of objects contained in the image and gaze attraction strength indicating strength of gaze-attraction to the objects. The representative points in a predetermined range of the image are grouped, and wherein a gaze guidance path passing through the objects in units of a group is calculated based on the gaze attraction strength of the grouped representative points.

According to the construction, the representative points in a predetermined range of the image are grouped, and the gaze guidance path passing through the objects in units of a group is calculated based on the gaze attraction strength of the grouped representative points.

According to the exemplary aspect, the same effect as that of the gaze guidance degree calculation system according to Exemplary Aspect 1 can be obtained.

[Exemplary Aspect 13]

In addition, a gaze guidance degree calculation system according to Exemplary Aspect 13 of the present invention is a gaze guidance degree calculation system to calculate a degree of gaze-guidance of an image based on positions of representative points of objects contained in the image and gaze attraction strength indicating strength of gaze-attraction to the objects. The representative points in a predetermined range of the image are grouped, and wherein a gaze guidance path passing through the objects corresponding to grouped representative points which are grouped and the objects corresponding to non-grouped representative points which are not grouped is calculated based on gaze attraction strength of the grouped representative points and the non-grouped representative points.

According to the construction, the representative points in a predetermined range of the image are grouped, and the gaze guidance path passing through the objects corresponding to grouped representative points which are grouped and the objects corresponding to non-grouped representative points which are not grouped is calculated based on gaze attraction strength of the grouped representative points and the non-grouped representative points.

According to the exemplary aspect, the same effect as that of the gaze guidance degree calculation system according to Exemplary Aspect 1 can be obtained.

[Exemplary Aspect 14]

On the other hand, in order to address or achieve the aforementioned object, a gaze guidance degree calculation system according to Exemplary Aspect 14 of the present invention is a gaze guidance degree calculation program to calculate a degree of gaze-guidance of an image based on a position of a representative point of an object contained in the image and gaze attraction strength indicating strength of gaze-attraction to the object, including a program allowing a computer to execute a procedure, the procedure calculates a gaze guidance degree indicating a degree of gaze-guidance of the image from a predetermined starting point based on the gaze attraction strength of the representative point in a specific region of the image.

According to the construction, the program is read out by the computer, and the computer executes the procedure according to the read-out program, so that the same operation and effect as those of the gaze guidance degree calculation system according to Exemplary Aspect 1 can be obtained.

[Exemplary Aspect 15]

In addition, a gaze guidance degree calculation program according to Exemplary Aspect 15 of the present invention is a gaze guidance degree calculation program to calculate a degree of gaze-guidance of an image based on image data, including a program allowing a computer to execute a procedure, wherein the procedure includes: a representative-point position acquisition step of acquiring a position of a representative point of an object contained in the image; a gaze attraction strength acquisition step of acquiring gaze attraction strength indicating strength of gaze-attraction to the object; and a gaze guidance degree calculation step of calculating a gaze guidance degree indicating a degree of gaze-guidance of the image from a predetermined starting point based on the position of the representative point acquired by the representative-point position acquisition step and the gaze attraction strength acquired by the gaze attraction strength acquisition step. Wherein the gaze guidance degree calculation step calculates the gaze guidance degree based on the gaze attraction strength of the representative point in a specific region of the image.

According to the construction, the program is read out by the computer, and the computer executes the procedure according to the read-out program, so that the same operation and effect as those of the gaze guidance degree calculation system according to Exemplary Aspect 2 can be obtained.

Here, as the representative-point position acquisition step, any constructions which can acquire the position of the representative point may be employed. For example, the position of the representative point may be input by such an input unit. In addition, the position of the representative point may be acquired from such an external terminal. Otherwise, the position of the representative point may be calculated based on image data. In other words, the acquisition operation includes at least one of inputting, acquisition, and calculation operations. The same description is available to the storage medium according to Exemplary Aspect 28 and the gaze guidance degree calculation method according to Exemplary Aspects 42 and 43.

Here, as the gaze attraction strength acquisition step, any constructions which can acquire the gaze attraction strength may be employed. For example, the gaze attraction strength may be input by such an input unit. In addition, the gaze attraction strength may be acquired from such an external terminal. Otherwise, the gaze attraction strength may be calculated based on image data. In other words, the acquisition operation includes at least one of inputting, acquisition, and calculation operations. The same description is available to the storage medium according to Exemplary Aspect 28 and the gaze guidance degree calculation method according to Exemplary Aspects 42 and 43.

[Exemplary Aspect 16]

In addition, a gaze guidance degree calculation program according to Exemplary Aspect 16 of the present invention is a gaze guidance degree calculation program according to Exemplary Aspect 15 which further includes a program to implement a process comprised of specific region setting step for setting the specific region based on a position of the starting point, wherein the gaze guidance degree calculation step calculates the gaze guidance degree based on the gaze attraction strength of the representative point in the specific region set by the specific region setting device.

According to the construction, the program is read out by the computer, and the computer executes the procedure according to the read-out program, so that the same operation and effect as those of the gaze guidance degree calculation system according to Exemplary Aspect 3 can be obtained.

[Exemplary Aspect 17]

In addition, a gaze guidance degree calculation program according to Exemplary Aspect 16 of the present invention is a gaze guidance degree calculation program according to Exemplary Aspect 15, wherein the specific region setting step sets a region surrounded by straight lines, curved lines, arcs, or other segmented lines or a region surrounded by rectangle, circle, ellipse or a geometrical shape as the specific region.

According to the construction, the program is read out by the computer, and the computer executes the procedure according to the read-out program, so that the same operation and effect as those of the gaze guidance degree calculation system according to Exemplary Aspect 4 can be obtained.

[Exemplary Aspect 18]

In addition, a gaze guidance degree calculation program according to Exemplary Aspect 18 of the present invention is a gaze guidance degree calculation program according to any one of Exemplary Aspects 15 to 17. The gaze guidance degree calculation step includes: a gaze guidance direction calculation step for calculating gaze guidance direction indicating a direction of gaze-guidance from the starting point to the specific region; and a gaze guidance strength calculation step for calculating gaze guidance strength indicating strength of gaze-guidance from the starting point to the specific region. The gaze guidance strength calculation step calculates the gaze guidance direction and the gaze guidance strength as the gaze guidance degree.

According to the construction, the program is read out by the computer, and the computer executes the procedure according to the read-out program, so that the same operation and effect as those of the gaze guidance degree calculation system according to Exemplary Aspect 5 can be obtained.

[Exemplary Aspect 19]

In addition, a gaze guidance degree calculation program according to Exemplary Aspect 19 of the present invention is a gaze guidance degree calculation program according to Exemplary Aspect 18. The gaze guidance direction calculation step calculates a predetermined direction from the starting point as the gaze guidance direction.

According to the construction, the program is read out by the computer, and the computer executes the procedure according to the read-out program, so that the same operation and effect as those of the gaze guidance degree calculation system according to Exemplary Aspect 6 can be obtained.

[Exemplary Aspect 20]

In addition, a gaze guidance degree calculation program according to Exemplary Aspect 20 of the present invention is a gaze guidance degree calculation program according to Exemplary Aspect 18, wherein the gaze guidance direction calculation step calculates the gaze guidance direction based on the position of the starting point and the position of the representative point in the specific region.

According to the construction, the program is read out by the computer, and the computer executes the procedure according to the read-out program, so that the same operation and effect as those of the gaze guidance degree calculation system according to Exemplary Aspect 7 can be obtained.

[Exemplary Aspect 21]

In addition, a gaze guidance degree calculation program according to Exemplary Aspect 21 of the present invention is a gaze guidance degree calculation program according to Exemplary Aspect 18, wherein there exists a plurality of the representative points in the specific region, and wherein the gaze guidance direction calculation step calculates the gaze guidance direction based on a statistical value of gaze attraction strength of the representative points.

According to the construction, the program is read out by the computer, and the computer executes the procedure according to the read-out program, so that the same operation and effect as those of the gaze guidance degree calculation system according to Exemplary Aspect 8 can be obtained.

[Exemplary Aspect 22]

In addition, a gaze guidance degree calculation program according to Exemplary Aspect 22 of the present invention is a gaze guidance degree calculation program according to any one Exemplary Aspects 18 to 21, wherein the gaze guidance strength calculation step calculates the gaze guidance strength based on the gaze attraction strength of the representative point in the specific region.

According to the construction, the program is read out by the computer, and the computer executes the procedure according to the read-out program, so that the same operation and effect as those of the gaze guidance degree calculation system according to Exemplary Aspect 9 can be obtained.

[Exemplary Aspect 23]

In addition, a gaze guidance degree calculation program according to Exemplary Aspect 23 of the present invention is a gaze guidance degree calculation program according to Exemplary Aspect 22, wherein there exists a plurality of the representative points in the specific region, and wherein the gaze guidance strength calculation step calculates the gaze guidance strength based on statistical values of positions and gaze attraction strength of the representative points.

According to the construction, the program is read out by the computer, and the computer executes the procedure according to the read-out program, so that the same operation and effect as those of the gaze guidance degree calculation system according to Exemplary Aspect 10 can be obtained.

[Exemplary Aspect 24]

In addition, a gaze guidance degree calculation program according to Exemplary Aspect 24 of the present invention is a gaze guidance degree calculation program according to any one Exemplary Aspects 18 to 23, wherein the gaze guidance degree calculation step calculates the gaze guidance directions and the gaze guidance strength corresponding to a plurality of the specific regions of the image, and wherein the gaze guidance degree calculation step calculates the calculated gaze guidance directions and gaze attraction strength of the specific regions as the gaze guidance degrees thereof.

According to the construction, the program is read out by the computer, and the computer executes the procedure according to the read-out program, so that the same operation and effect as those of the gaze guidance degree calculation system according to Exemplary Aspect 11 can be obtained.

[Exemplary Aspect 25]

In addition, a gaze guidance degree calculation program according to Exemplary Aspect 25 of the present invention is a gaze guidance degree calculation program to calculate a degree of gaze-guidance of an image based on positions of representative points of objects contained in the image and gaze attraction strength indicating strength of gaze-attraction to the objects, including a program allowing a computer to execute a procedure, wherein the procedure groups the representative points in a predetermined range of the image are grouped and calculates a gaze guidance path passing through the objects in units of a group based on the gaze attraction strength of the grouped representative points.

According to the construction, the program is read out by the computer, and the computer executes the procedure according to the read-out program, so that the same operation and effect as those of the gaze guidance degree calculation system according to Exemplary Aspect 12 can be obtained.

[Exemplary Aspect 26]

In addition, a gaze guidance degree calculation program according to Exemplary Aspect 16 of the present invention is a gaze guidance degree calculation program to calculate a degree of gaze-guidance of an image based on positions of representative points of objects contained in the image and gaze attraction strength indicating strength of gaze-attraction to the objects, including a program allowing a computer to execute a procedure, wherein the procedure groups the representative points in a predetermined range of the image are grouped and calculates a gaze guidance path passing through the objects corresponding to grouped representative points which are grouped and the objects corresponding to non-grouped representative points which are not grouped based on gaze attraction strength of the grouped representative points and the non-grouped representative points.

According to the construction, the program is read out by the computer, and the computer executes the procedure according to the read-out program, so that the same operation and effect as those of the gaze guidance degree calculation system according to Exemplary Aspect 13 can be obtained.

[Exemplary Aspect 27]

On the other hand, in order to address or achieve the aforementioned object, a storage medium according to Exemplary Aspect 27 of the present invention is a computer-readable storage medium storing a gaze guidance degree calculation program to calculate a degree of gaze-guidance of an image based on a position of a representative point of an object contained in the image and gaze attraction strength indicating strength of gaze-attraction to the object. The storage medium stores a program allowing a computer to execute a procedure, and the procedure calculates a gaze guidance degree indicating a degree of gaze-guidance of the image from a predetermined starting point based on the gaze attraction strength of the representative point in a specific region of the image.

According to the construction, the program is read out by the computer, and the computer executes the procedure according to the read-out program, so that the same operation and effect as those of the gaze guidance degree calculation system according to Exemplary Aspect 1 can be obtained.

[Exemplary Aspect 28]

In addition, a storage medium according to Exemplary Aspect 28 of the present invention is a computer-readable storage medium storing a gaze guidance degree calculation program for calculating a degree of gaze-guidance of an image based on image data, wherein the storage medium stores a program allowing a computer to execute a procedure, wherein the procedure includes: a representative-point position acquisition step of acquiring a position of a representative point of an object contained in the image; a gaze attraction strength acquisition step of acquiring gaze attraction strength indicating strength of gaze-attraction to the object; and a gaze guidance degree calculation step of calculating a gaze guidance degree indicating a degree of gaze-guidance of the image from a predetermined starting point based on the position of the representative point acquired by the representative-point position acquisition step and the gaze attraction strength acquired by the gaze attraction strength acquisition step, and wherein the gaze guidance degree calculation step calculates the gaze guidance degree based on the gaze attraction strength of the representative point in a specific region of the image.

According to the construction, the program is read out by the computer, and the computer executes the procedure according to the read-out program, so that the same operation and effect as those of the gaze guidance degree calculation system according to Exemplary Aspect 2 can be obtained.

[Exemplary Aspect 29]

In addition, a storage medium according to Exemplary Aspect 29 of the present invention is a storage medium according to Exemplary Aspect 28, which further includes a program to implement a process comprised of specific region setting step to set the specific region based on a position of the starting point, wherein the gaze guidance degree calculation step calculates the gaze guidance degree based on the gaze attraction strength of the representative point in the specific region set by the specific region setting device.

According to the construction, the program is read out by the computer, and the computer executes the procedure according to the read-out program, so that the same operation and effect as those of the gaze guidance degree calculation system according to Exemplary Aspect 3 can be obtained.

[Exemplary Aspect 30]

In addition, a storage medium according to Exemplary Aspect 30 of the present invention is a storage medium according to Exemplary Aspect 29 of the present invention, wherein the specific region setting step sets a region surrounded by straight lines, curved lines, arcs, or other segmented lines or a region surrounded by rectangle, circle, ellipse or a geometrical shape as the specific region.

According to the construction, the program is read out by the computer, and the computer executes the procedure according to the read-out program, so that the same operation and effect as those of the gaze guidance degree calculation system according to Exemplary Aspect 4 can be obtained.

[Exemplary Aspect 31]

In addition, a storage medium according to Exemplary Aspect 31 of the present invention is a storage medium according to any one of Exemplary Aspects 28 to 30, wherein the gaze guidance degree calculation step includes: a gaze guidance direction calculation step for calculating gaze guidance direction indicating a direction of gaze-guidance from the starting point to the specific region; and a gaze guidance strength calculation step for calculating gaze guidance strength indicating strength of gaze-guidance from the starting point to the specific region, and wherein the gaze guidance strength calculation step calculates the gaze guidance direction and the gaze guidance strength as the gaze guidance degree.

According to the construction, the program is read out by the computer, and the computer executes the procedure according to the read-out program, so that the same operation and effect as those of the gaze guidance degree calculation system according to Exemplary Aspect 5 can be obtained.

[Exemplary Aspect 32]

In addition, a storage medium according to Exemplary Aspect 32 of the present invention is a storage medium according to Exemplary Aspect 31, wherein the gaze guidance direction calculation step calculates a predetermined direction from the starting point as the gaze guidance direction.

According to the construction, the program is read out by the computer, and the computer executes the procedure according to the read-out program, so that the same operation and effect as those of the gaze guidance degree calculation system according to Exemplary Aspect 6 can be obtained.

[Exemplary Aspect 33]

In addition, a storage medium according to Exemplary Aspect 33 of the present invention is a storage medium according to Exemplary Aspect 31, wherein the gaze guidance direction calculation step calculates the gaze guidance direction based on the position of the starting point and the position of the representative point in the specific region.

According to the construction, the program is read out by the computer, and the computer executes the procedure according to the read-out program, so that the same operation and effect as those of the gaze guidance degree calculation system according to Exemplary Aspect 7 can be obtained.

[Exemplary Aspect 34]

In addition, a storage medium according to Exemplary Aspect 34 of the present invention is a storage medium according to Exemplary Aspect 31, wherein there exist a plurality of the representative points in the specific region, and wherein the gaze guidance direction calculation step calculates the gaze guidance direction based on a statistical value of gaze attraction strength of the representative points.

According to the construction, the program is read out by the computer, and the computer executes the procedure according to the read-out program, so that the same operation and effect as those of the gaze guidance degree calculation system according to Exemplary Aspect 8 can be obtained.

[Exemplary Aspect 35]

In addition, a storage medium according to Exemplary Aspect 35 of the present invention is a storage medium according to any one of Exemplary Aspects 31 to 34, wherein the gaze guidance strength calculation step calculates the gaze guidance strength based on the gaze attraction strength of the representative point in the specific region.

According to the construction, the program is read out by the computer, and the computer executes the procedure according to the read-out program, so that the same operation and effect as those of the gaze guidance degree calculation system according to Exemplary Aspect 9 can be obtained.

[Exemplary Aspect 36]

In addition, a storage medium according to Exemplary Aspect 36 of the present invention is a storage medium according to Exemplary Aspect 35, wherein there exist a plurality of the representative points in the specific region, and wherein the gaze guidance strength calculation step calculates the gaze guidance strength based on statistical values of positions and gaze attraction strength of the representative points.

According to the construction, the program is read out by the computer, and the computer executes the procedure according to the read-out program, so that the same operation and effect as those of the gaze guidance degree calculation system according to Exemplary Aspect 10 can be obtained.

[Exemplary Aspect 37]

In addition, a storage medium according to Exemplary Aspect 37 of the present invention is a storage medium according to any one of Exemplary Aspects 31 to 36, wherein the gaze guidance degree calculation step calculates the gaze guidance directions and the gaze guidance strength corresponding to a plurality of the specific regions of the image, and wherein the gaze guidance degree calculation step calculates the calculated gaze guidance directions and gaze attraction strength of the specific regions as the gaze guidance degrees thereof.

According to the construction, the program is read out by the computer, and the computer executes the procedure according to the read-out program, so that the same operation and effect as those of the gaze guidance degree calculation system according to Exemplary Aspect 11 can be obtained.

[Exemplary Aspect 38]

In addition, a storage medium according to Exemplary Aspect 38 of the present invention is a computer-readable storage medium storing a gaze guidance degree calculation program to calculate a degree of gaze-guidance of an image based on positions of representative points of objects. The image and gaze attraction strength indicating strength of gaze-attraction to the objects, the storage medium stores a program allowing a computer to execute a procedure, and wherein the procedure groups the representative points in a predetermined range of the image are grouped and calculate a gaze guidance path passing through the objects in units of a group based on the gaze attraction strength of the grouped representative points.

According to the construction, the program is read out by the computer, and the computer executes the procedure according to the read-out program, so that the same operation and effect as those of the gaze guidance degree calculation system according to Exemplary Aspect 12 can be obtained.

[Exemplary Aspect 39]

In addition, a storage medium according to Exemplary Aspect 39 of the present invention is a computer-readable storage medium storing a gaze guidance degree calculation program to calculate a degree of gaze-guidance of an image based on positions of representative points of objects contained in the image and gaze attraction strength indicating strength of gaze-attraction to the objects. The storage medium stores a program allowing a computer to execute a procedure, and the procedure groups the representative points in a predetermined range of the image are grouped and calculates a gaze guidance path passing through the objects corresponding to grouped representative points which are grouped and the objects corresponding to non-grouped representative points which are not grouped based on gaze attraction strength of the grouped representative points and the non-grouped representative points.

According to the construction, the program is read out by the computer, and the computer executes the procedure according to the read-out program, so that the same operation and effect as those of the gaze guidance degree calculation system according to Exemplary Aspect 13 can be obtained.

[Exemplary Aspect 40]

On the other hand, in order to address or achieve the aforementioned object, a gaze guidance degree calculation method according to Exemplary Aspect 40 of the present invention is a gaze guidance degree calculation method including a step of calculating a degree of gaze-guidance of an image based on a position of a representative point of an object contained in the image and gaze attraction strength indicating strength of gaze-attraction to the object, wherein a gaze guidance degree indicating a degree of gaze-guidance of the image from a predetermined starting point is calculated based on the gaze attraction strength of the representative point in a specific region of the image.

According to the exemplary aspect, the same effect as that of the gaze guidance degree calculation system according to Exemplary Aspect 1 can be obtained.

[Exemplary Aspect 41]

In addition, a gaze guidance degree calculation method according to Exemplary Aspect 41 of the present invention is a gaze guidance degree calculation method including a step of calculating a degree of gaze-guidance of an image based on a position of a representative point of an object contained in the image and gaze attraction strength indicating strength of gaze-attraction to the object, wherein an arithmetic device calculates a gaze guidance degree indicating a degree of gaze-guidance of the image from a predetermined starting point based on the gaze attraction strength of the representative point in a specific region of the image.

According to the exemplary aspect, the same effect as that of the gaze guidance degree calculation system according to Exemplary Aspect 1 can be obtained.

[Exemplary Aspect 42]

In addition, a gaze guidance degree calculation method according to Exemplary Aspect 42 of the present invention is a gaze guidance degree calculation method of calculating a degree of gaze-guidance of an image based on image data, including: a representative-point position acquisition step of acquiring a position of a representative point of an object contained in the image; a gaze attraction strength acquisition step of acquiring gaze attraction strength indicating strength of gaze-attraction to the object; and a gaze guidance degree calculation step of calculating a gaze guidance degree indicating a degree of gaze-guidance of the image from a predetermined starting point based on the position of the representative point acquired by the representative-point position acquisition step and the gaze attraction strength acquired by the gaze attraction strength acquisition step. The gaze guidance degree calculation step calculates the gaze guidance degree based on the gaze attraction strength of the representative point in a specific region of the image.

According to the exemplary aspect, the same effect as that of the gaze guidance degree calculation system according to Exemplary Aspect 2 can be obtained.

[Exemplary Aspect 43]

In addition, a gaze guidance degree calculation method according to Exemplary Aspect 43 of the present invention is a gaze guidance degree calculation method of calculating a degree of gaze-guidance of an image based on image data, including: a representative-point position acquisition step where an arithmetic device acquires a position of a representative point of an object contained in the image; a gaze attraction strength acquisition step where the arithmetic device acquires gaze attraction strength indicating strength of gaze-attraction to the object; and a gaze guidance degree calculation step where the arithmetic device calculates a gaze guidance degree indicating a degree of gaze-guidance of the image from a predetermined starting point based on the position of the representative point acquired by the representative-point position acquisition step and the gaze attraction strength acquired by the gaze attraction strength acquisition step. The gaze guidance degree calculation step calculates the gaze guidance degree based on the gaze attraction strength of the representative point in a specific region of the image.

According to the exemplary aspect, the same effect as that of the gaze guidance degree calculation system according to Exemplary Aspect 2 can be obtained.

[Exemplary Aspect 44]

In addition, a gaze guidance degree calculation method according to Exemplary Aspect 44 of the present invention is a gaze guidance degree calculation method according to Exemplary Aspect 42, further including a specific region setting step for setting the specific region based on a position of the starting point, wherein the gaze guidance degree calculation step calculates the gaze guidance degree based on the gaze attraction strength of the representative point in the specific region set by the specific region setting step.

According to the exemplary aspect, the same effect as that of the gaze guidance degree calculation system according to Exemplary Aspect 3 can be obtained.

[Exemplary Aspect 45]

In addition, a gaze guidance degree calculation method according to Exemplary Aspect 45 of the present invention is a gaze guidance degree calculation method according to Exemplary Aspect 44 of the present invention is a gaze guidance degree calculation program according to Exemplary Aspect 15, wherein the specific region setting step sets a region surrounded by straight lines, curved lines, arcs, or other segmented lines or a region surrounded by rectangle, circle, ellipse or a geometrical shape as the specific region.

According to the exemplary aspect, the same effect as that of the gaze guidance degree calculation system according to Exemplary Aspect 4 can be obtained.

[Exemplary Aspect 46]

In addition, a gaze guidance degree calculation method according to Exemplary Aspect 46 of the present invention is a gaze guidance degree calculation method according to any one of Exemplary Aspects 42, 44 and 45, wherein the gaze guidance degree calculation step includes: a gaze guidance direction calculation step for calculating gaze guidance direction indicating a direction of gaze-guidance from the starting point to the specific region; and a gaze guidance strength calculation step for calculating gaze guidance strength indicating strength of gaze-guidance from the starting point to the specific region. The gaze guidance strength calculation step calculates the gaze guidance direction and the gaze guidance strength as the gaze guidance degree.

According to the exemplary aspect, the same effect as that of the gaze guidance degree calculation system according to Exemplary Aspect 5 can be obtained.

[Exemplary Aspect 47]

In addition, a gaze guidance degree calculation method according to Exemplary Aspect 47 of the present invention is a gaze guidance degree calculation method according to Exemplary Aspect 46, wherein the gaze guidance direction calculation step calculates a predetermined direction from the starting point as the gaze guidance direction.

According to the exemplary aspect, the same effect as that of the gaze guidance degree calculation system according to Exemplary Aspect 6 can be obtained.

[Exemplary Aspect 48]

In addition, a gaze guidance degree calculation method according to Exemplary Aspect 48 of the present invention is a gaze guidance degree calculation method according to Exemplary Aspect 46, wherein the gaze guidance direction calculation step calculates the gaze guidance direction based on the position of the starting point and the position of the representative point in the specific region.

According to the exemplary aspect, the same effect as that of the gaze guidance degree calculation system according to Exemplary Aspect 7 can be obtained.

[Exemplary Aspect 49]

In addition, a gaze guidance degree calculation method according to Exemplary Aspect 49 of the present invention is a gaze guidance degree calculation method according to Exemplary Aspect 46, wherein there exist a plurality of the representative points in the specific region, and wherein the gaze guidance direction calculation step calculates the gaze guidance direction based on a statistical value of gaze attraction strength of the representative points.

According to the exemplary aspect, the same effect as that of the gaze guidance degree calculation system according to Exemplary Aspect 8 can be obtained.

[Exemplary Aspect 50]

In addition, a gaze guidance degree calculation method according to Exemplary Aspect 50 of the present invention is a gaze guidance degree calculation method according to any one of Exemplary Aspects 46 to 49, wherein the gaze guidance strength calculation step calculates the gaze guidance strength based on the gaze attraction strength of the representative point in the specific region.

According to the exemplary aspect, the same effect as that of the gaze guidance degree calculation system according to Exemplary Aspect 9 can be obtained.

[Exemplary Aspect 51]

In addition, a gaze guidance degree calculation method according to Exemplary Aspect 51 of the present invention is a gaze guidance degree calculation method according to Exemplary Aspect 50, wherein there exist a plurality of the representative points in the specific region, and wherein the gaze guidance strength calculation step calculates the gaze guidance strength based on statistical values of positions and gaze attraction strength of the representative points.

According to the exemplary aspect, the same effect as that of the gaze guidance degree calculation system according to Exemplary Aspect 10 can be obtained.

[Exemplary Aspect 52]

In addition, a gaze guidance degree calculation method according to Exemplary Aspect 52 of the present invention is a gaze guidance degree calculation method according to any one of Exemplary Aspects 46 to 51, wherein the gaze guidance degree calculation step calculates the gaze guidance directions and the gaze guidance strength corresponding to a plurality of the specific regions of the image, and wherein the gaze guidance degree calculation step calculates the calculated gaze guidance directions and gaze attraction strength of the specific regions as the gaze guidance degrees thereof.

According to the exemplary aspect, the same effect as that of the gaze guidance degree calculation system according to Exemplary Aspect 11 can be obtained.

[Exemplary Aspect 53]

In addition, a gaze guidance degree calculation method according to Exemplary Aspect 53 of the present invention is a gaze guidance degree calculation method including a step of calculating a degree of gaze-guidance of an image based on positions of representative points of objects contained in the image and gaze attraction strength indicating strength of gaze-attraction to the objects. The representative points in a predetermined range of the image are grouped, and wherein a gaze guidance path passing through the objects in units of a group is calculated based on the gaze attraction strength of the grouped representative points.

According to the exemplary aspect, the same effect as that of the gaze guidance degree calculation system according to Exemplary Aspect 12 can be obtained.

[Exemplary Aspect 54]

In addition, a gaze guidance degree calculation method according to Exemplary Aspect 54 of the present invention is a gaze guidance degree calculation method including a step of calculating a degree of gaze-guidance of an image based on positions of representative points of objects contained in the image and gaze attraction strength indicating strength of gaze-attraction to the objects. The representative points in a predetermined range of the image are grouped, and a gaze guidance path passing through the objects corresponding to grouped representative points which are grouped and the objects corresponding to non-grouped representative points which are not grouped is calculated based on gaze attraction strength of the grouped representative points and the non-grouped representative points.

According to the exemplary aspect, the same effect as that of the gaze guidance degree calculation system according to Exemplary Aspect 13 can be obtained.

BRIEF DESCRIPTION OF THE DRAWINGS

FIG. 27 is a table showing distances between representative points of segmented regions;

FIG. 28 is a table showing directional components and magnitudes of vectors from a starting point Pa to representative points Pb to Pd;

FIG. 32 is a table showing directional components and magnitudes of vectors from a starting point Pa to representative points Pb to Pd;

FIG. 33 is a table showing a result of adjusting directional components and magnitudes of vectors Pab, Pac, and Pad in an equal scale;

FIG. 34 is a table showing a result of normalization of vectors Pab, Pac, and Pad;

DETAILED DESCRIPTION OF PREFERRED EMBODIMENTS

Figure 1:
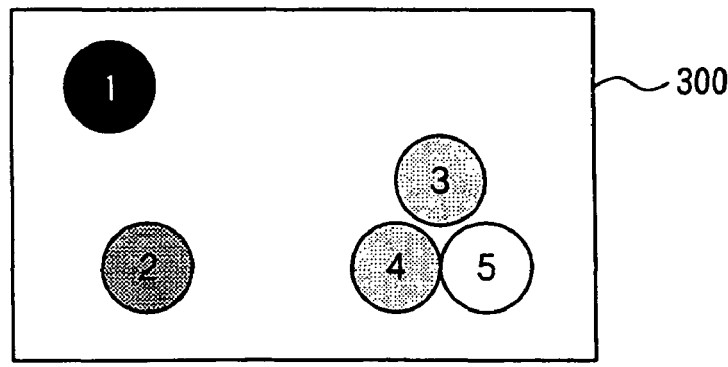
FIG. 1 is a schematic showing arrangement of layout elements in a layout image 300.
Figure 24:
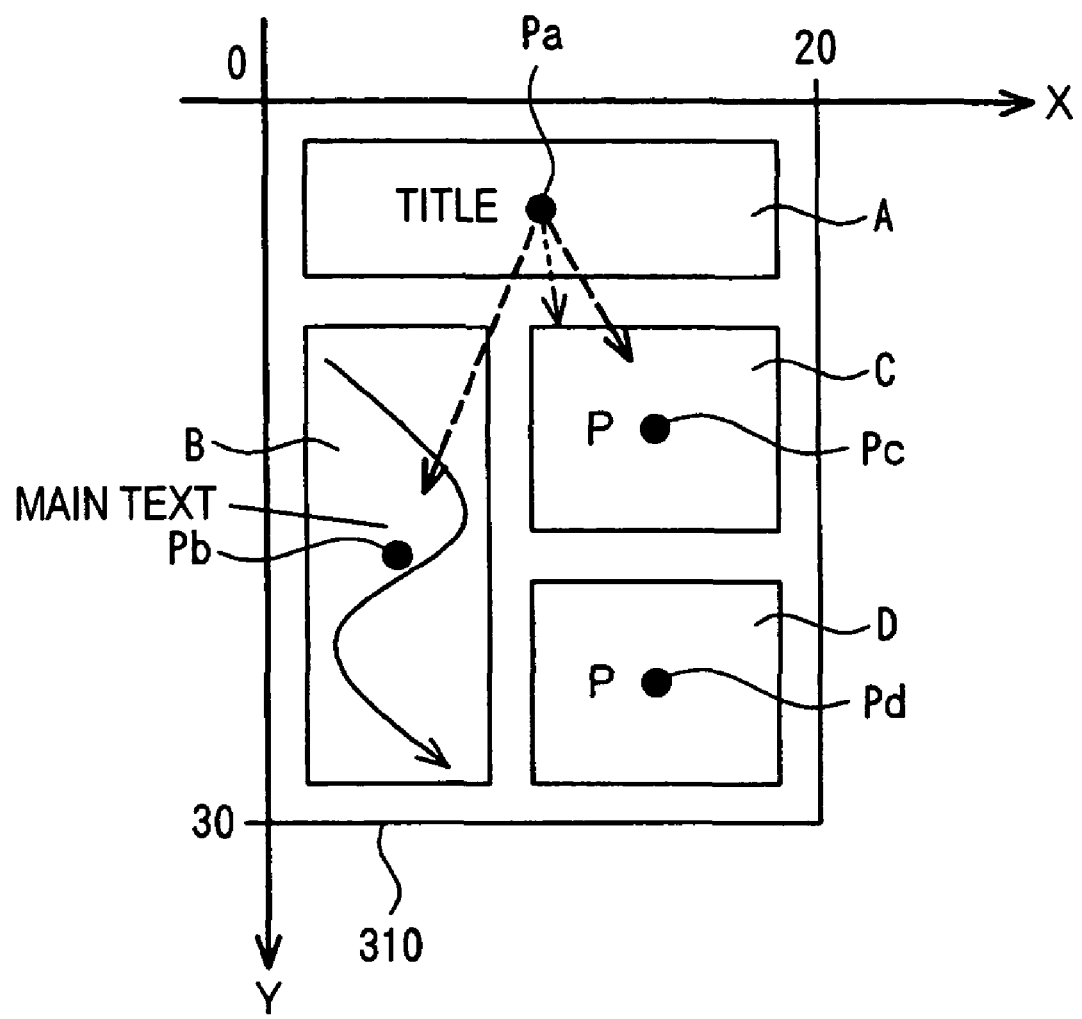
FIG. 24 is a schematic showing a gaze guidance degree is calculated according to only gaze attraction strength without consideration of positions of layout elements.

Now, a first exemplary embodiment of the present invention will be described with reference to the drawings. FIG. 1 or 24 are schematics showing the first exemplary embodiment of a gaze guidance degree calculation system, a gaze guidance degree calculation program, a storage medium, and a gaze guidance degree calculation method according to exemplary embodiments of the present invention.

In the exemplary embodiment, the gaze guidance degree calculation system, the gaze guidance degree calculation program, the storage medium, and the gaze guidance degree calculation method according to exemplary embodiments of the present invention are applied to a case where a gaze guidance degree indicating a direction and strength of gaze-guidance from a predetermined starting point in a layout image where a plurality of layout elements are arranged are generated.

Firstly, a summary of the present invention will be described with reference to FIGS. 1 to 3.

FIG. 1 is a schematic showing arrangement of the layout elements in the layout image 300.

As shown in FIG. 1, five layout elements 1 to 5 are arranged in the layout image 300. The layout elements 1 to 5 are allocated by reference numerals in descending order of the gaze attraction strength thereof.

FIG. 2 is a schematic showing a case of forming a gaze guidance path 302 through which gaze is guided among layout elements.

Figure 2A:
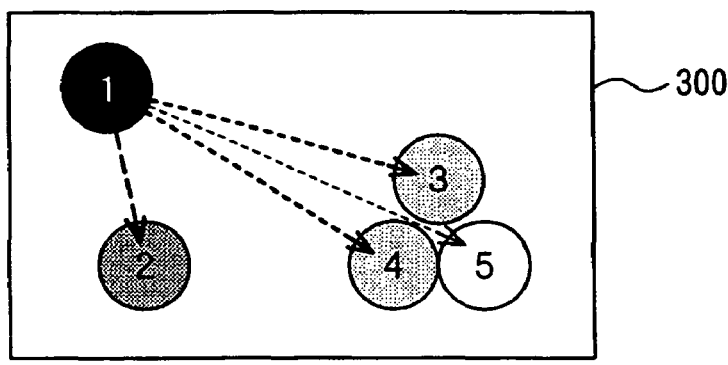
FIGS. 2A-B are schematics showing a case of forming a gaze guidance path 302 through which gaze is guided among layout elements.
Figure 2B:
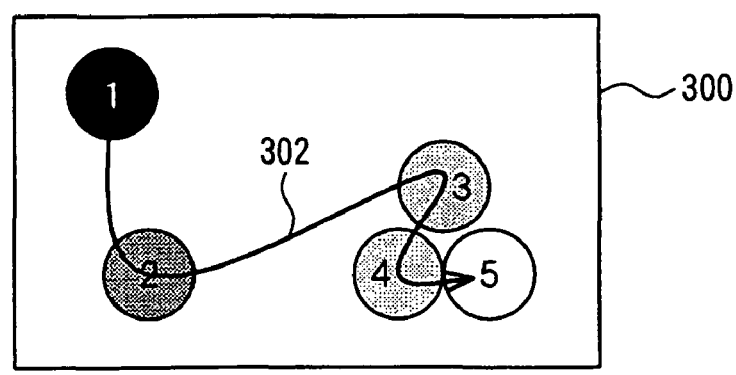

In a case where the gaze guidance path is formed in descending order of the gaze attraction strength, since the layout element 1 has the largest gaze attraction strength, the layout element 1 is firstly determined to be a starting point of the gaze guidance path. Next, in order to determine the gaze guidance path from the layout element 1 to the next gaze-guided layout element, paths from the layout element 1 to the layout elements 2 to 5 can be represented by vectors according to the gaze attraction strength of the layout elements 2 to 5 as shown in FIG. 2A. Here, since the vector to the layout element 2 is the largest one, the layout element 2 is determined to be the next passing point of the gaze guidance path. As a result, as shown in FIG. 2B, the gaze guidance path 302 can be formed to sequentially pass through the layout elements 1 to 5 in the order of the layout element 1 (as a starting point), the layout element 2, the layout element 3, the layout element 4, and the layout element 5.

However, the layout elements 3 to 5 are arranged as a group in the lower right direction as seen from the layout element 1, and the layout element 2 is arranged alone in the lower left direction as seen from the layout element 1. According to the gaze attraction strength of the layout elements 3 to 5, the gaze may be guided to the group of layout elements 3 to 5 rather than the layout element 2.

Figure 3A:
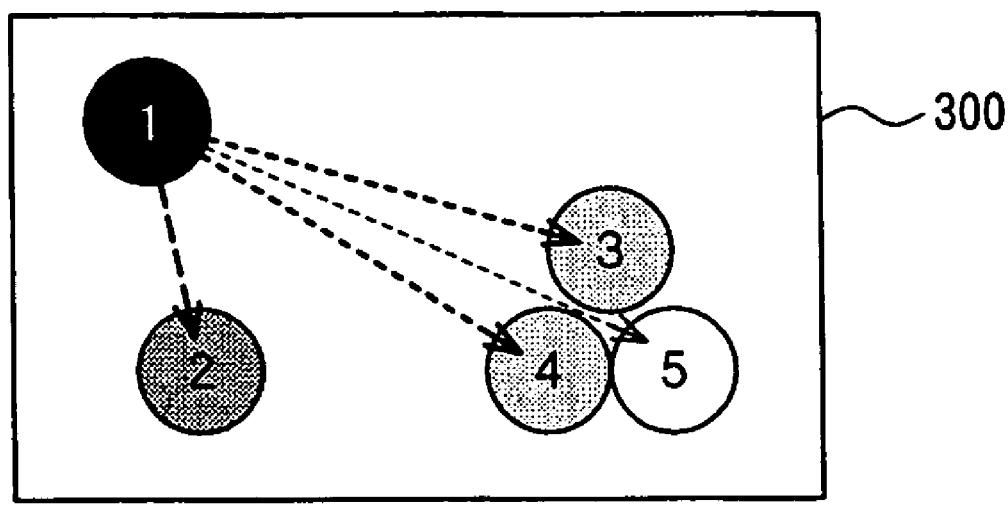
FIGS. 3A-B are schematics showing a case of forming a gaze guidance path 304 through which gaze is guided among layout elements.
Figure 3B:
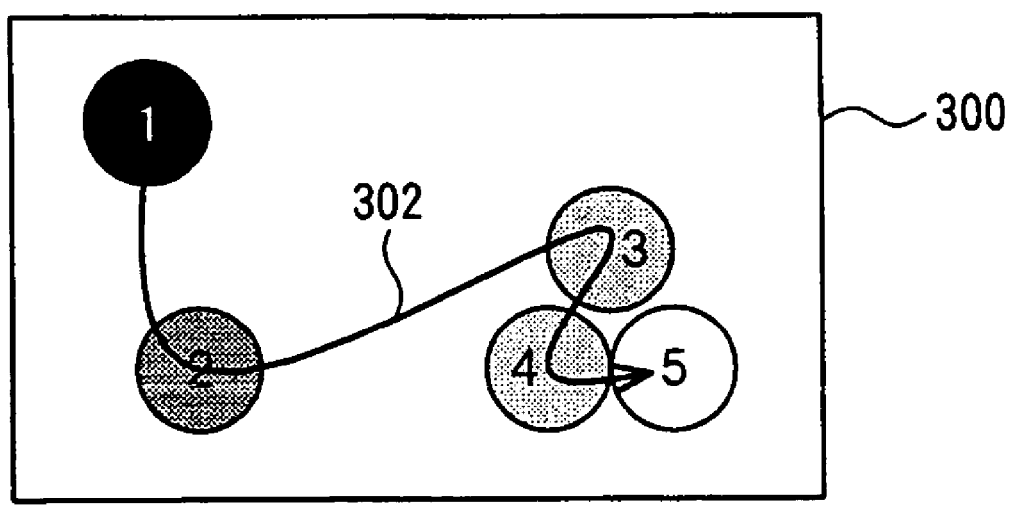

FIGS. 3A-B are schematics showing a case of forming a gaze guidance path 304 through which gaze is guided among layout elements.

Therefore, it is appropriate that the gaze guidance path is formed with consideration of positions of the layout elements as well as the gaze attraction strength thereof. In other words, in a case where a layout element to which gaze is sequentially guided from the layout element 1 is determined, the group of layout elements 3 to 5 in the lower right direction as seen from the layout element 1 is represented by one vector obtained by composition of vectors of the layout elements 3 to 5 as shown in FIG. 3A, and then, a larger one between the composition vector of the layout elements 3 to 5 and the vector of the layout element 2 is selected. In the example of FIG. 3A, since the composition vector is larger, the group of the layout elements 3 to 5 is determined to be a next passing point of the gaze guidance path. As a result, as shown in FIG. 3B, the gaze guidance path 302 can be formed to sequentially pass through the layout elements 1 to 5 in the order of the layout element 1 (as a starting point), the layout element 3, the layout element 4, the layout element 5, and the layout element 2.

In the exemplary embodiment, in a case where a plurality of the layout elements arranged in a group in a predetermined direction as seen from a predetermined starting point, the layout elements are treated as a group. As shown in FIG. 3A, a gaze guidance degree indicating a degree of gaze-guidance from the predetermined starting point is generated as design support information.

Now, a construction of a layout apparatus 100 to which the present invention is applied to will be described with reference to FIGS. 4 and 5.

Figure 4:
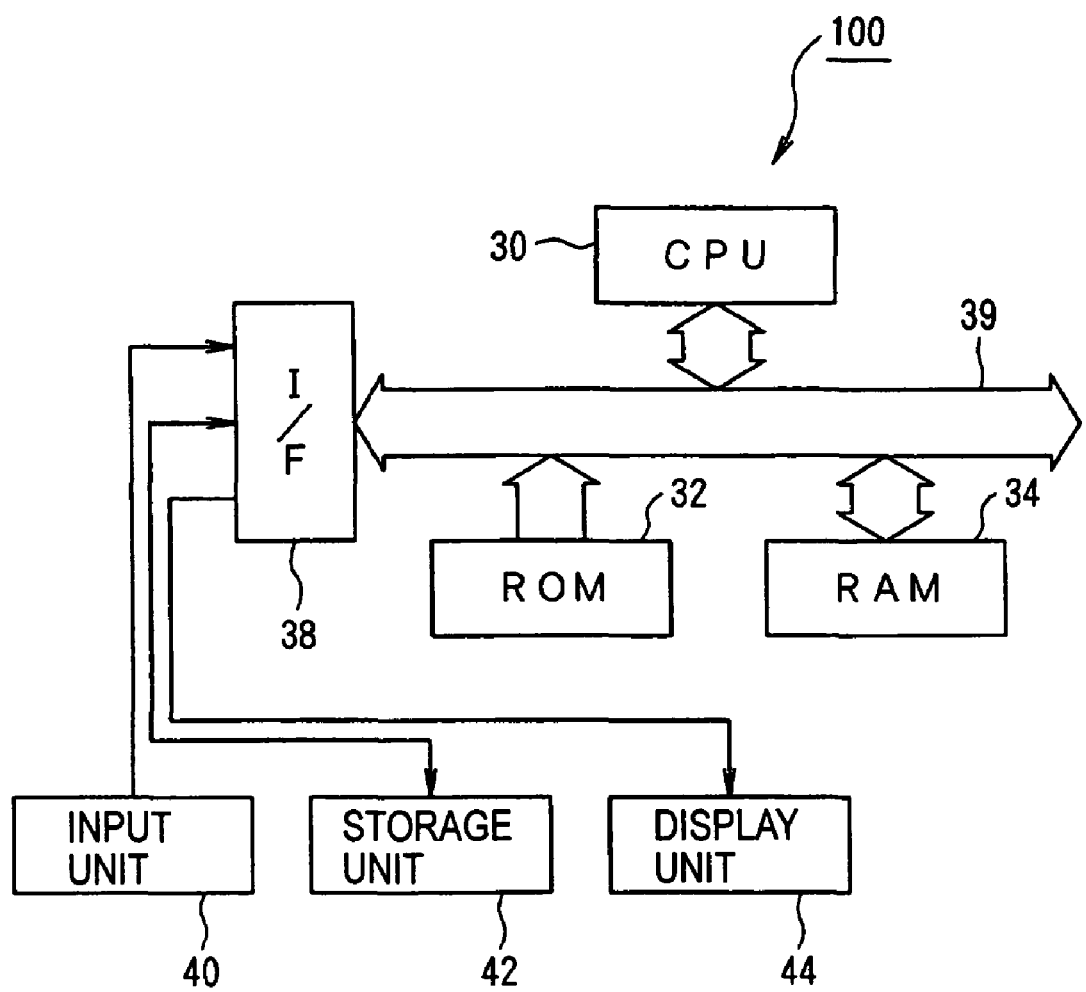
FIG. 4 is a schematic showing a hardware construction of a layout apparatus 100.

FIG. 4 is a schematic showing a hardware construction of the layout apparatus 100.

The layout 100 includes, as shown in FIG. 4, a CPU 30 to control arithmetic operations and the entire system according to a control program, a ROM 32 to store the control program, etc., of the CPU 30 in a predetermined region, a RAM 34 to store data read out from the ROM 32, etc., or arithmetic results for the arithmetic operations of the CPU 30, and an I/F 38 to interface input/output data with external devices. The components are data-communicably connected to each other via a bus 39, that is, a signal line to transmit data.

The external devices contented to the I/F 38 include an input unit 40 such as a keyboard and a mouse capable of input data as a human interface, a storage device 42 to store data or tables as files, and a display unit 44 to display image on a screen according to an image signals.

Figure 5:
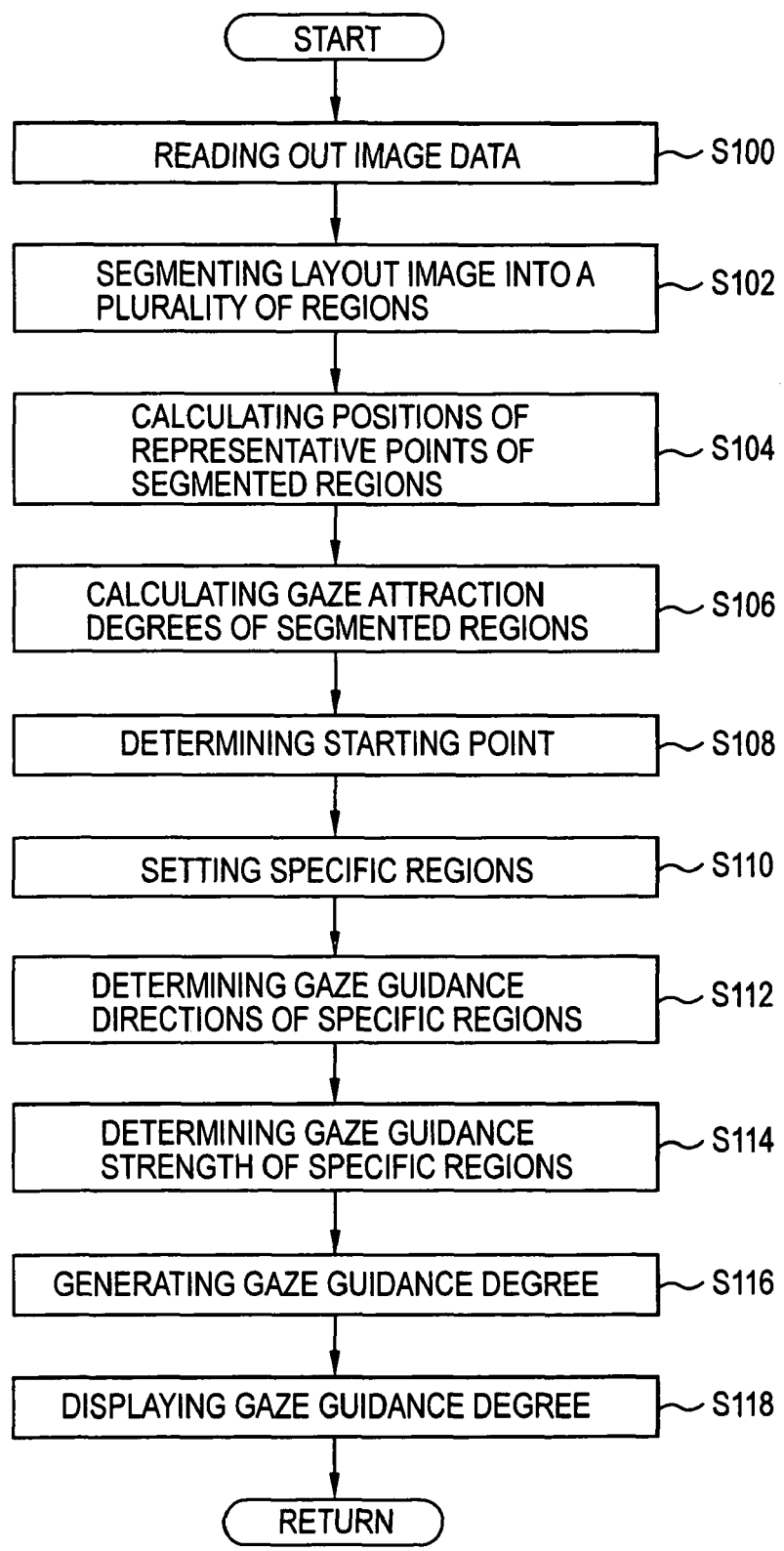
FIG. 5 is a flowchart showing a gaze guidance degree generation procedure.

The CPU 30 including a micro-processing unit (MPU) and the like drives a predetermined program stored in the predetermined regions of the ROM 32 to execute a gaze guidance degree generation procedure shown in FIG. 5 according to the program.

FIG. 5 is a flowchart showing a gaze guidance degree generation procedure.

The gaze guidance degree generation procedure is a procedure to generate a gaze guidance degree indicating a degree of gaze-guidance from a predetermined starting point. When the procedure is executed by the CPU 30, as shown in FIG. 5, the procedure firstly proceeds to a step S100.

In the step S100, image data is read out from the storage device 42, the procedure proceeds to a step S102, a layout image is segmented into a plurality of regions according to the read-out image data, and the procedure proceeds to a step S104.

In the step S104, positions of representative points of the segmented regions are calculated according to the read-out image data, the procedure proceeds to a step S106, the gaze attraction strength of the segmented regions is calculated according to the read-out image data, and the procedure proceeds to a step S108.

In the step S108, a starting point is determined among the plurality of representative points according to the calculated gaze attraction strength, the procedure proceeds to a step S110, a plurality of specific regions are set with reference to the determined starting point, and the procedure proceeds to a step S112.

In the step S112, gaze guidance directions indicating directions of gaze-guidance from the starting point to the specific regions are calculated in the set specific regions, the procedure proceeds to a step S114, the gaze guidance strength indicating strength of gaze-guidance from the starting point to the specific regions are calculated in the set specific regions, and the procedure proceeds to a step S116.

In the step S116, the gaze guidance degree indicating a degree of gaze-guidance from the determined starting point is generated, the procedure proceeds to a step S118, the generated gaze guidance degree is displayed on the layout image, a series of the procedure end, and the procedure returns to the original procedure.

Now, a region segmentation procedure of the step S102 will be described in detail with reference to FIGS. 6 and 7.

Figure 6:
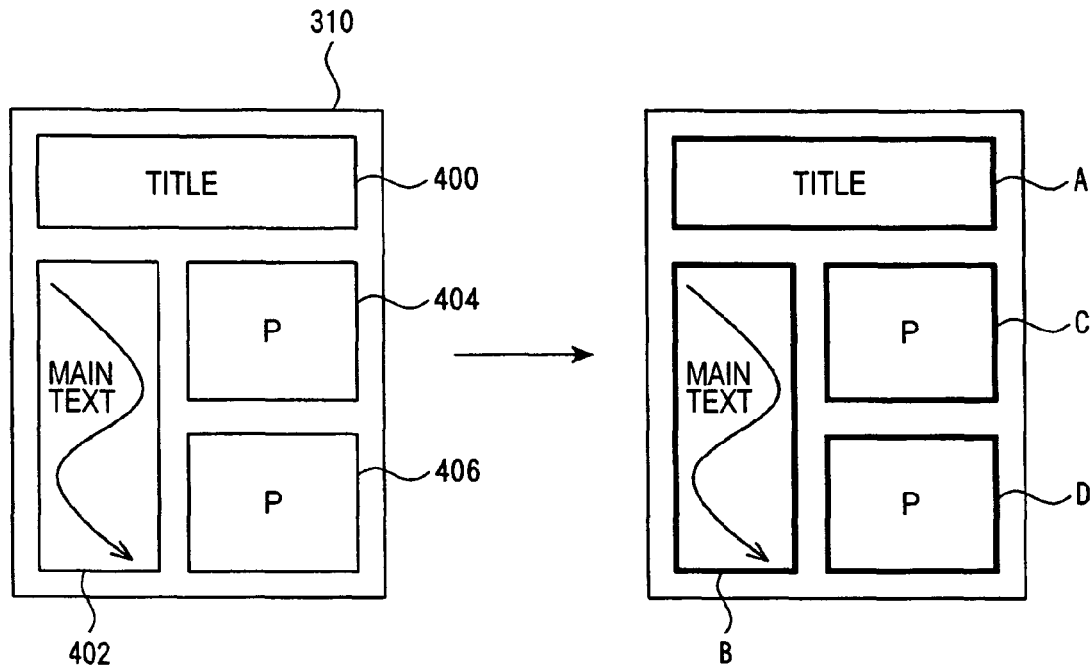
FIG. 6 is a schematic showing a case where a layout image 310 is segmented into a plurality of regions.

FIG. 6 is a schematic showing a case where a layout image 310 is segmented into a plurality of regions.

As shown in FIG. 6, the layout image 310 includes four layout elements 400, 402, 404 and disposed in longitudinal layout regions. In FIG. 6, the layout element 400 is disposed in the upper region, and the layout elements 402 and 404 are sequentially disposed from the left region in the lateral direction under the layout element 400. In addition, the layout element 406 is disposed under the layout element 404.

The layout image 310 is constituted as logical data by storing the layout elements 400, 402, 404 and 406 in respective information storage frames according to a layout templet which defines a layout where a plurality of the information storage frames are arranged in the layout regions. In this case, the layout image 310 can be segmented into the plurality of regions by extracting the information on the information storage frames from the layout image 310. As a result, regions having the same sizes as those of the regions occupied by the layout elements 400, 402, 404 and 406 are treated as segmented regions A to D.

Figure 7:
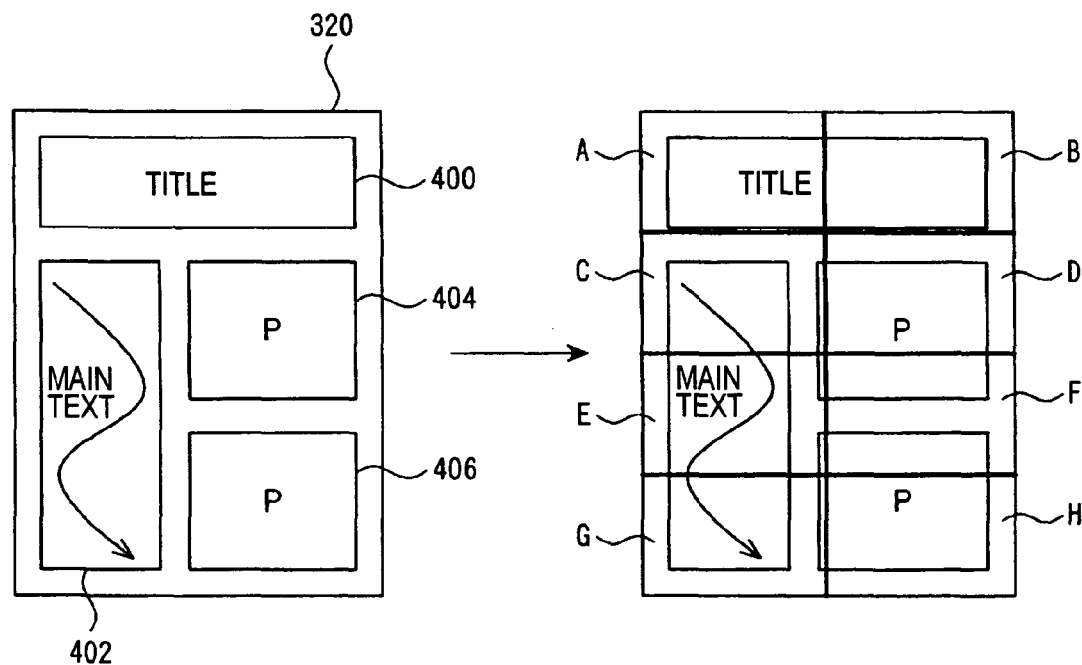
FIG. 7 is a schematic showing a case where a layout image 320 is segmented into a plurality of regions.

FIG. 7 is a schematic showing a case where a layout image 320 is segmented into a plurality of regions.

As shown in FIG. 7, the layout image 320 includes four layout elements 400, 402, 404 and 406 disposed in longitudinal layout regions, but it constituted as image data differently from the layout image 310. In this case, the layout image 320 can be segmented into a plurality of regions by using a related art region recognition technique (for example, Japanese Patent Publication Sowha 61-32712 or Tanaka). In the example of FIG. 7, the layout image 320 is simply segmented into eight equal parts, so that the uppermost left region, the uppermost right region, the second-row left region, the second-row right region, the third-row left region, the third-row right region, the lowermost left region, and the lowermost right region are treated as segmented regions A to H.

Now, since the layout images 310 and 320 can be processed in a similar manner, detailed description of procedures of the steps of FIG. 5 will be made on only the layout image 310 taken as an example.

Firstly, a representative-point position calculation procedure of the step S104 will be described with reference to FIG. 8.

Figure 8:
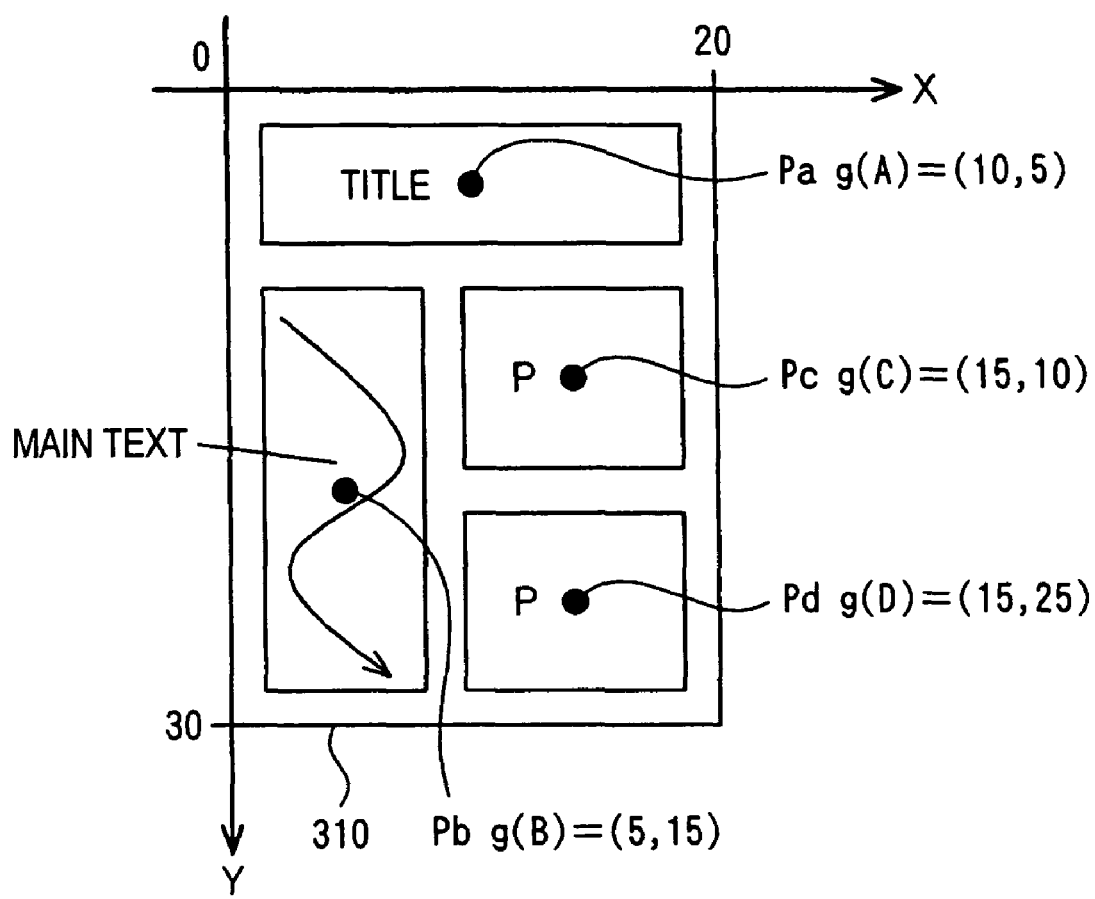
FIG. 8 is a schematic showing a case where positions of representative points of segmented regions A to D of the layout image 310 are calculated.

FIG. 8 is a schematic showing a case where positions of representative points of the segmented regions A to D of the layout image 310 are calculated.

Prior to obtaining the positions of the representative points, it is necessary to define a size of the layout image 310 and positions of the representative points of the segmented regions. For example, horizontal and vertical lengths of the layout image 310 are defined as "20" and "30", respectively, and centers of gravity of the segmented regions A to D are defined as representative points Pa to Pd. In this case, as shown in FIG. 8, the representative points Pa to Pd are calculated as (10, 5), (5, 15), (15, 10), and (15, 25).

Now, the gaze attraction strength calculation procedure will be described in detail with reference to FIG. 9.

In the step S106, a region (hereinafter, referred to as an attention region) to which a user is considered to pay attention is extracted among the segmented regions, and a degree of attention paid to the attention regions is calculated as a gaze attraction strength. In the exemplary embodiment, a concept of "attractiveness" is used as a reference of extraction of the attention region. The method of extracting the attractiveness is disclosed in detail in, for example, Japanese Unexamined Patent Application Publication No. 2001-126070 and Tanaka.

Now, the attractiveness will be described in brief. In order to extract the attention region, the attractiveness is estimated according to physical features of the original image. Here, the attractiveness denotes a parameter complying with a human subjectivity. From the result of the estimation, the most conspicuous region is extracted as the attention region. In other word, since the estimation of the attention region is made in conformity with the human subjectivity according to the physical feature, the attention region can be extracted in conformity with the human subjectivity.

For example, in a case where the physical features include color heterogeneity, the attractiveness can be estimated based on the difference between colors of the regions.

In addition, in a case where the physical features include form, area, and texture (shape) heterogeneities, if the attractiveness is estimated based on at least one of the four heterogeneities, the attractiveness can be accurately estimated according to the features of the original image.

In addition, in a case where estimation is also made on the three attributes of color (hue, chroma, and brightness), a region having a color near a conspicuous color (red) in conformity of the human subjectivity can be estimated as the most conspicuous region.

In addition, in a case where estimation is also made on the spatial frequency and areas of the regions in the original image, the most conspicuous region can be further accurately estimated.

In addition, the estimation of the attractiveness is carried out in the following steps.

(1) First, the original image is segmented into regions. In this step, the original image is segmented into drawing regions and picture regions. A region segmentation method utilizes a boundary detection method based on "eye flow", entitled "Edge Flow: A Framework of Boundary Detection and Image Segmentation" by W. Y. Ma, B. S. Manjunath, et al., in IEEE, in 1997.

(2) Next, the segmented drawing regions extracted, and the attractiveness of the regions is estimated.

The estimation of the attractiveness is carried out roughly as follow.

Firstly, the heterogeneity attractiveness of the regions is obtained. In this case, the color, texture, form, and area heterogeneities are obtained, and the heterogeneities are applied with weighting factors and linearly combined. And then, the heterogeneity attractiveness of the regions is obtained.

Next, the feature attractiveness of the regions is obtained. In this case, the color, spatial frequency, and area attractiveness is obtained, and the attractiveness is applied with weighting factors and linearly combined. And then, the feature attractiveness of the regions is obtained.

Next, the heterogeneity attractiveness and the feature attractiveness of the regions are added to each other, and an integration value of feature amount is estimated by using a predetermined beta function. And then, the attractiveness is calculated.

(3) Finally, a pattern diagram is generated by estimating the attractiveness based on the original image.

Figure 9:
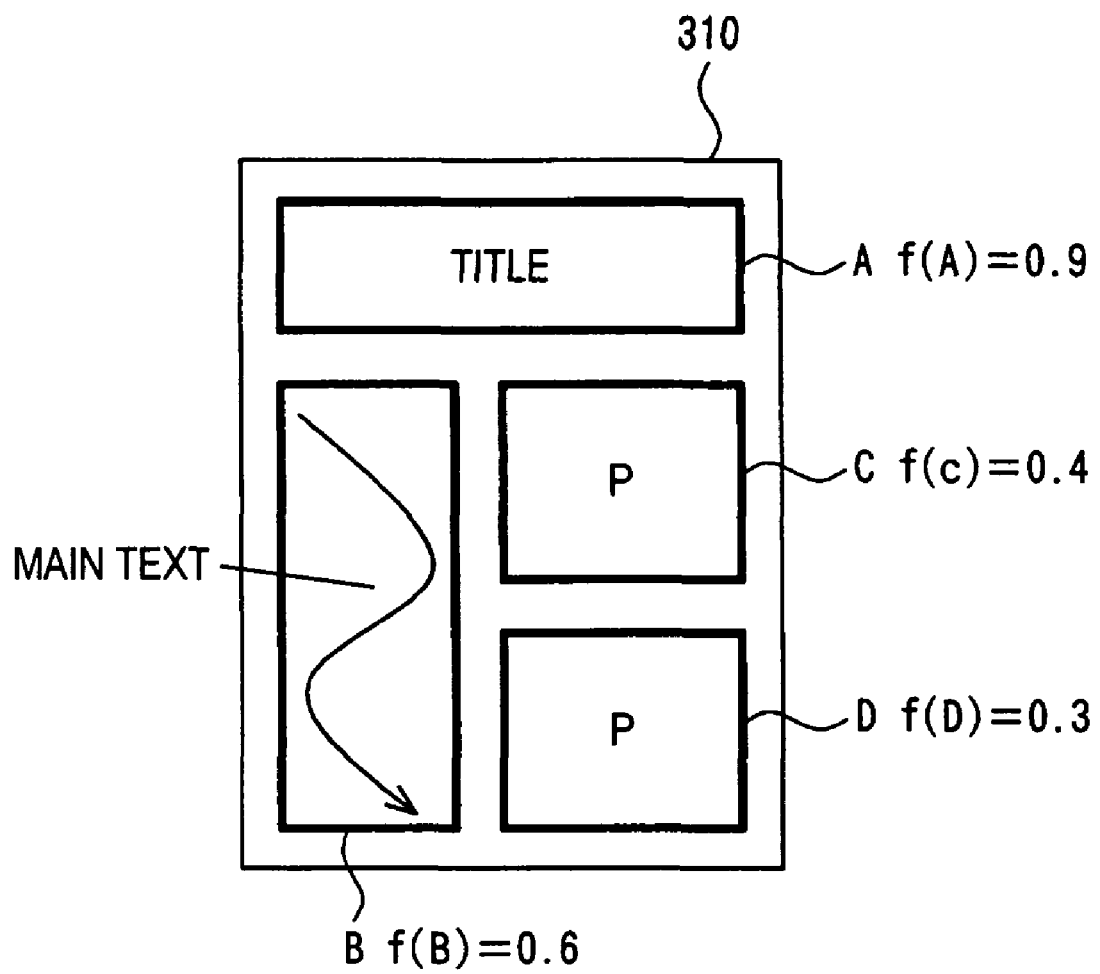
FIG. 9 is a schematic showing a case where gaze attraction strength of segmented regions A to D of the layout image 310 are calculated.

FIG. 9 is a schematic showing a case where gaze attraction strength of segmented regions A to D in a layout image 310 are calculated.

In a case where gaze attraction strength is calculated by using the attractiveness, the gaze attraction strength of the segmented regions A to D become, for example, "0.9", "0.6", "0.4", and "0.3", respectively, as shown in FIG. 9. In addition, since the attractiveness is in a range of from "0" to "1", the gaze attraction strength can be obtained in a range of from "0" to "1".

In addition, related art techniques may be employed as a technique to calculate the gaze attraction strength. For example, there are techniques to obtain the attention regions based on discontinuous portions in the image or gray-level information thereof disclosed in the following document (1) and techniques to obtain the attention regions based on the attractiveness disclosed in the following documents (2) to (4).
(1) Laurent Itti, Christof Koch and Ernst Niebur, "A Model of Saliency-based Visual Attention for Rapid Scene Analysis", IEEE Transaction on Pattern Analysis and Machine Intelligence, Vol. 20, No. 11, pp. 1254-1259, 1998. (2) Shoji Tanaka, Masayuki Inoue, Seiki Inoue, and Ryohei Nakatsu, "An image attention region extraction based on physical feature amount contributing attractiveness", Image Information Media Society, Vol. 52, No. 6, pp. 881-890, 1998. (3) Shoji Tanaka, Seiji Inokuchi and Yuichi Iwadate, "A Figure Extraction Method based on the Color and Texture Contrasts of Regions", IAPR ICIAP'99, 1999. (4) Shoji Tanaka, Seiji Inokuchi, Yuichi Iwadate, and Ryohei Nakatsu, "A Figure Extraction Method Using the Color and Texture Contrasts of Image Regions as Feature Amount", in the Information Processing Society, Vol. 40, No. 8, 1999.

Now, the starting-point determination procedure of the step S108 will be described in detail.

In the step S108, the representative point of the segmented region having the largest gaze attraction strength in the plurality of the representative points in the layout image is determined to be the starting point. In the layout image 310, since the segmented region A has the largest gaze attraction strength, the representative point Pa is determined to be the starting point.

Now, the specific region setting procedure of the step S110 will be described in detail with reference to FIGS. 10 to 15.

In the step S110, a plurality of the specific regions in the layout image are set with reference to the determined starting point. The specific regions are used to group a plurality of the segmented regions in a predetermined direction. The plurality of the segmented regions in one specific region are treated as one group, and the gaze guidance degrees of the specific regions are generated.

Figure 10:
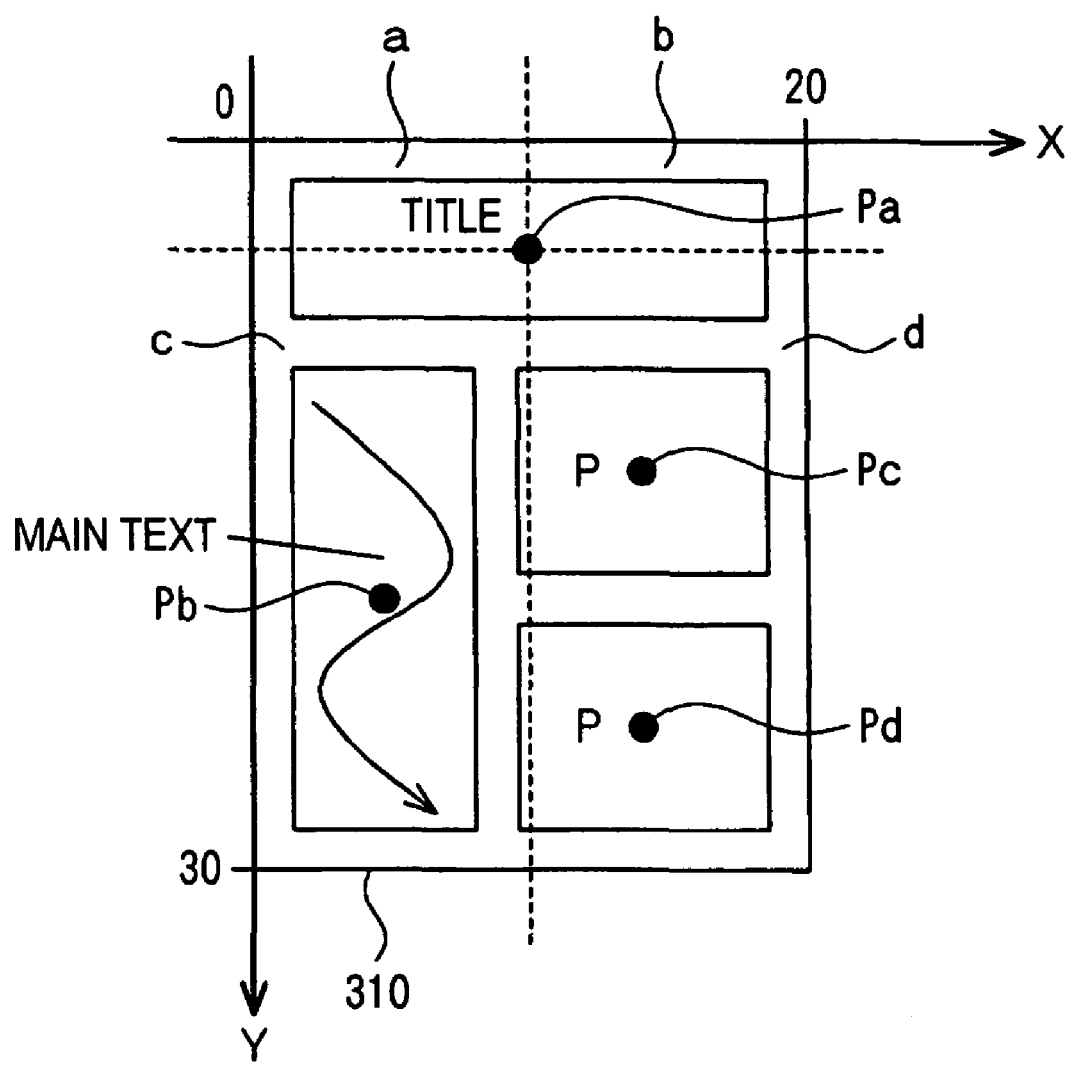
FIG. 10 is a schematic showing a case where specific regions are set by dividing the layout image 310 into four quadrants at a starting point Pa.

FIG. 10 is a schematic showing a case where specific regions are set by dividing the layout image 310 into four quadrants at the starting point Pa.

In a case where the specific region are set, as shown in FIG. 10, for example, the layout image 310 is divided into four quadrants at the starting point Pa, so that the upper left region, the upper right region, the lower left region, and the lower right region may be set as the specific regions a to d.

Figure 11:
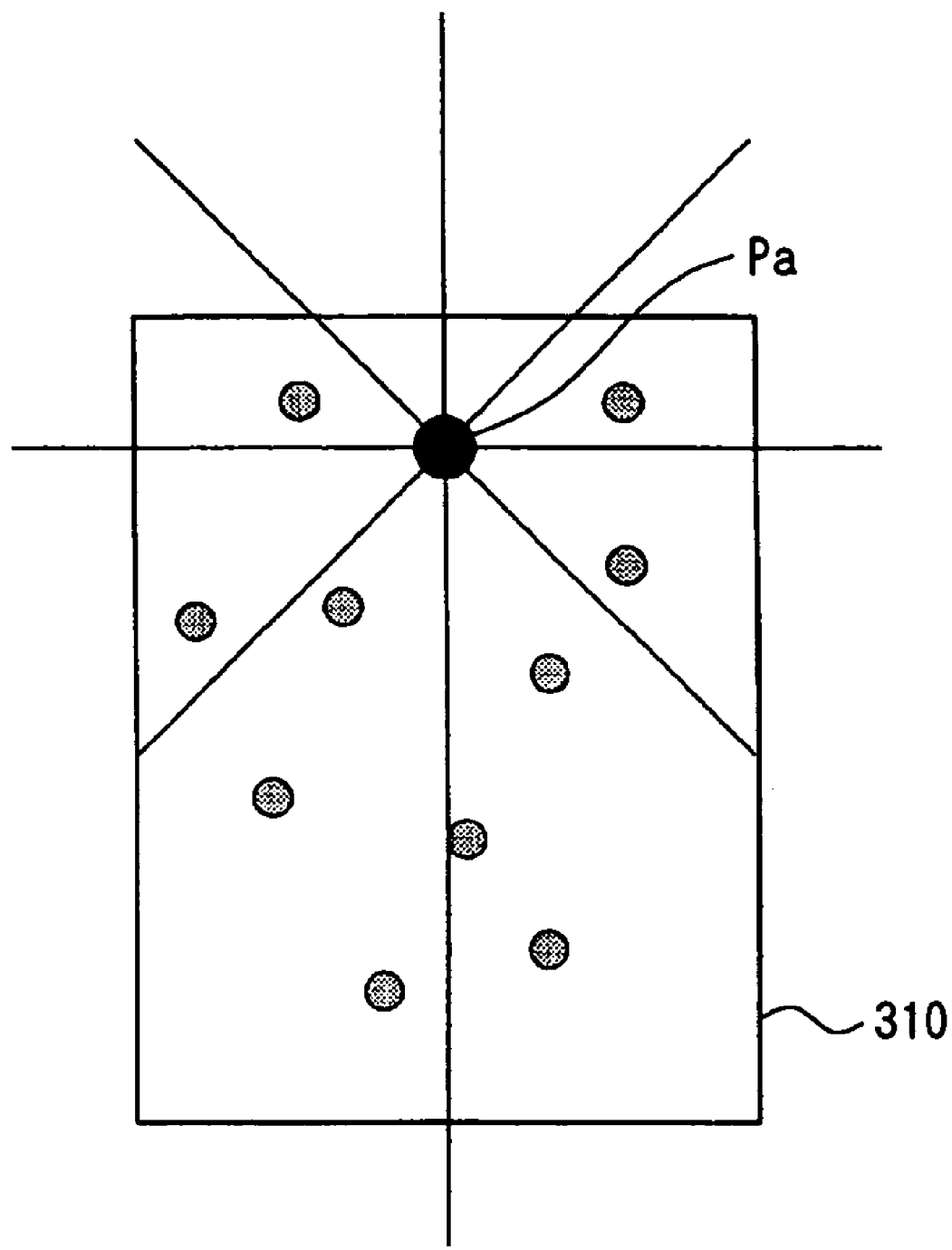
FIG. 11 is a schematic showing a case where specific regions are set by dividing the layout image 310 into eight equal parts at a starting point Pa.

FIG. 11 is a schematic showing a case where specific regions are set by dividing the layout image 310 into eight equal parts at the starting point Pa.

In addition, not limited to the example of FIG. 10, as shown in FIG. 11, for example, the layout image 310 is radially divided into eight equal parts at the starting point Pa, so that the divided regions may be set as the specific regions.

Figure 12:
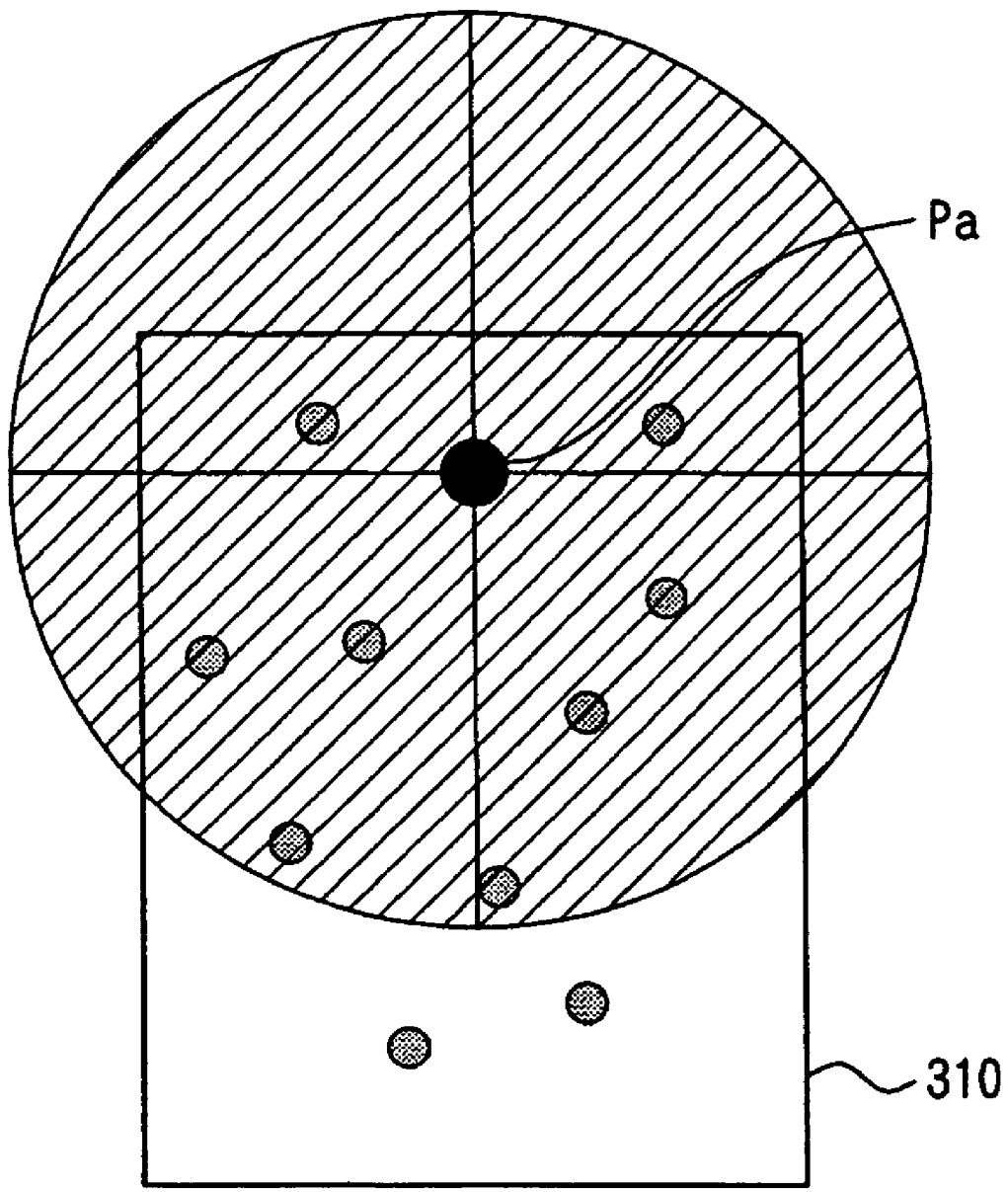
FIG. 12 is a schematic showing a case where specific regions are set as fan-shaped regions.

FIG. 12 is a schematic showing a case where specific regions are set as fan-shaped regions.

In addition, not limited to the examples of FIGS. 10 and 11, as shown in FIG. 12, for example, a circular region having a predetermined diameter and the starting point Pa as a center thereof is overlapped to the layout image 310, and the circular region is divided into four phase quadrants, so that regions obtained by overlapping fan-shaped regions (that is, the four quadrants) with the layout image 310 may be set as the specific regions.

Figure 13:
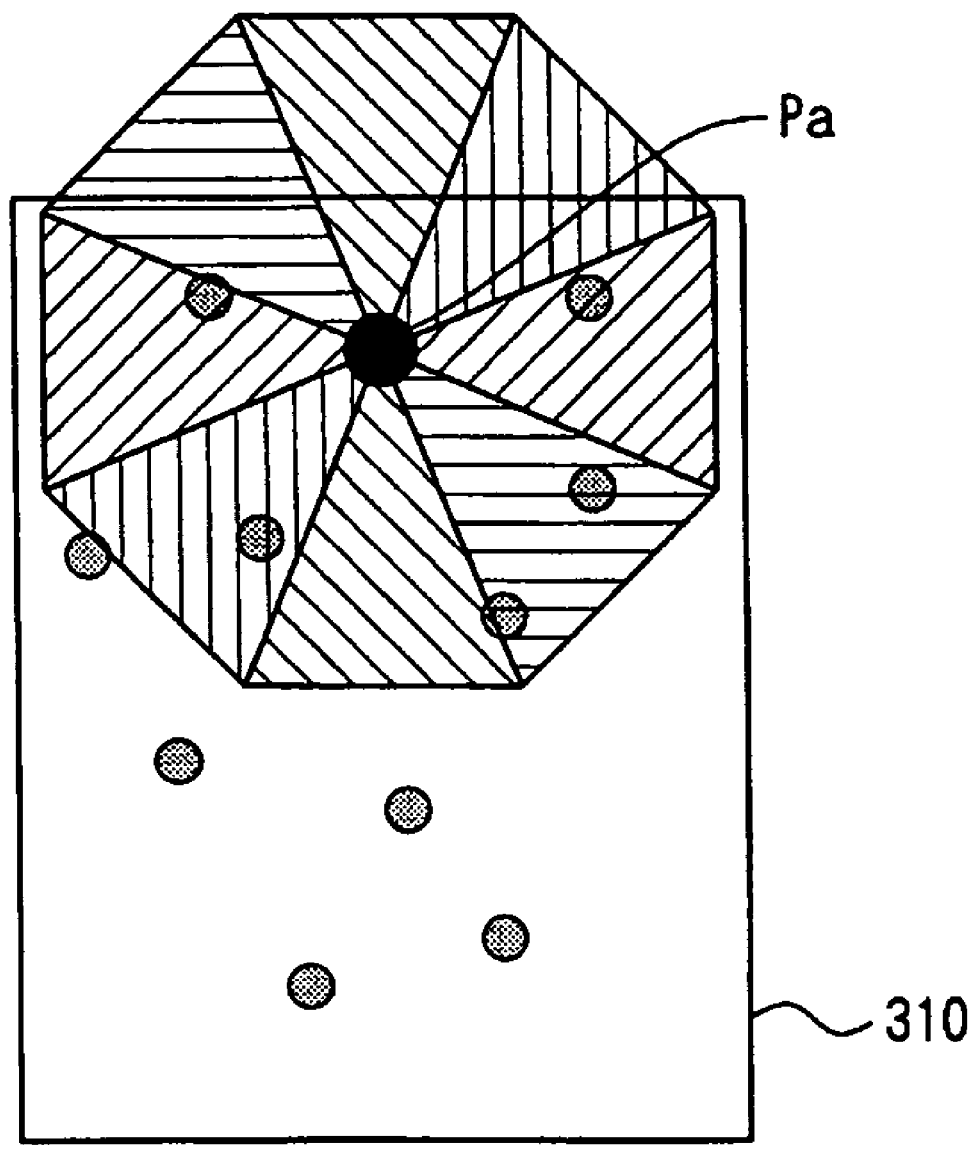
FIG. 13 is a schematic showing a case where specific regions are set as triangular regions.

FIG. 13 is a schematic showing a case where specific regions are set as triangular regions.

In addition, not limited to the examples of FIGS. 10 to 12, as shown in FIG. 13, for example, a plurality of triangular regions having the starting point Pa as vertexes thereof are overlapped to the layout region 310, so that regions obtained by overlapping the triangular regions with the layout image 310 are set at the specific regions.

Figure 14:
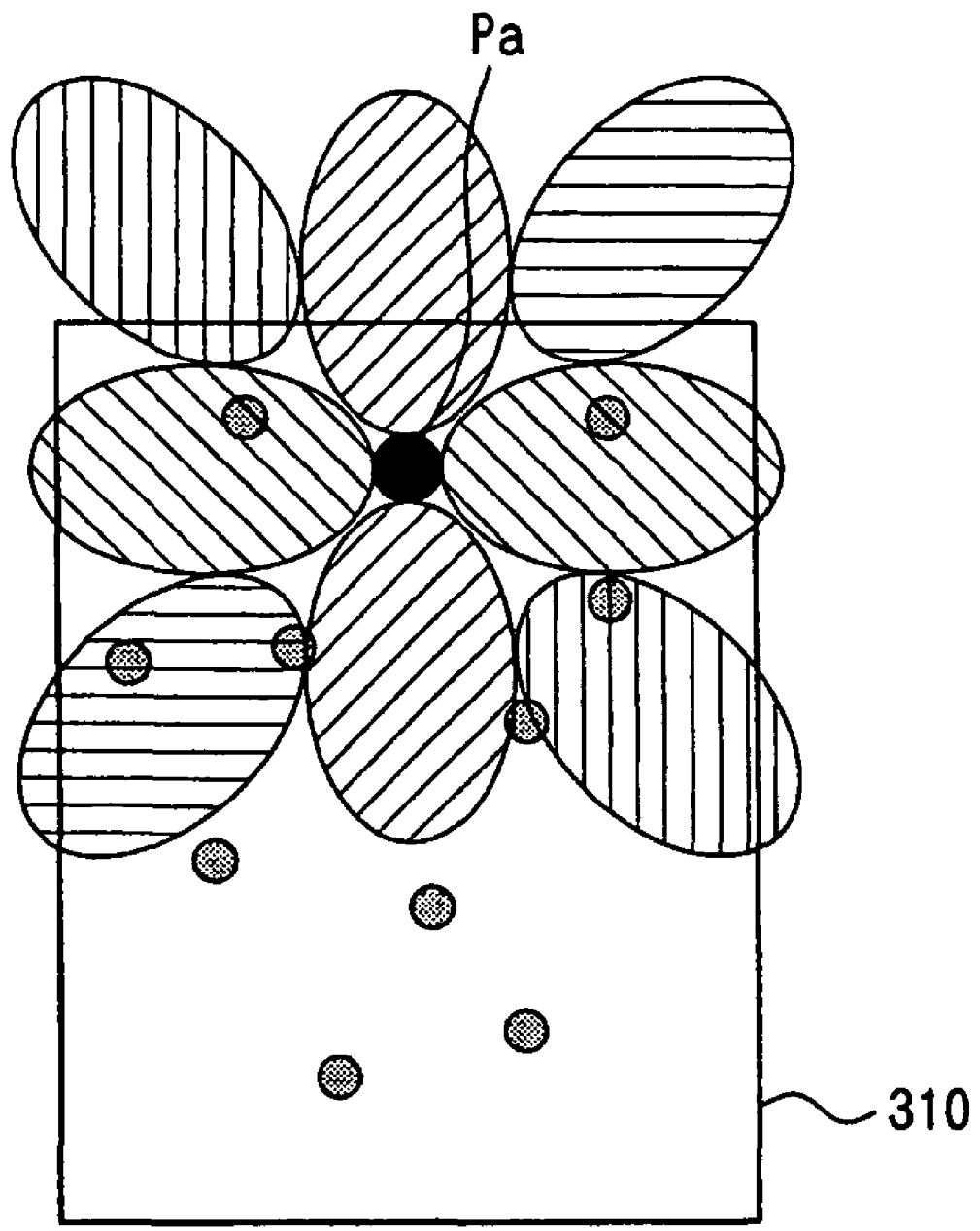
FIG. 14 is a schematic showing a case where specific regions are set as elliptical regions.

FIG. 14 is a schematic showing a case where specific regions are set as elliptical regions.

In addition, not limited to the examples of FIGS. 10 to 13, as shown in FIG. 14, for example, a plurality of elliptical regions disposed around the starting point Pa are overlapped to the layout image 310, so that regions obtained by overlapping the elliptical regions with the layout image 310 are set at the specific regions. In this case, straight lines connecting the starting point Pa with the centers of gravity of the elliptical regions are coincident or almost coincident with major axes of the elliptical regions.

Figure 15:
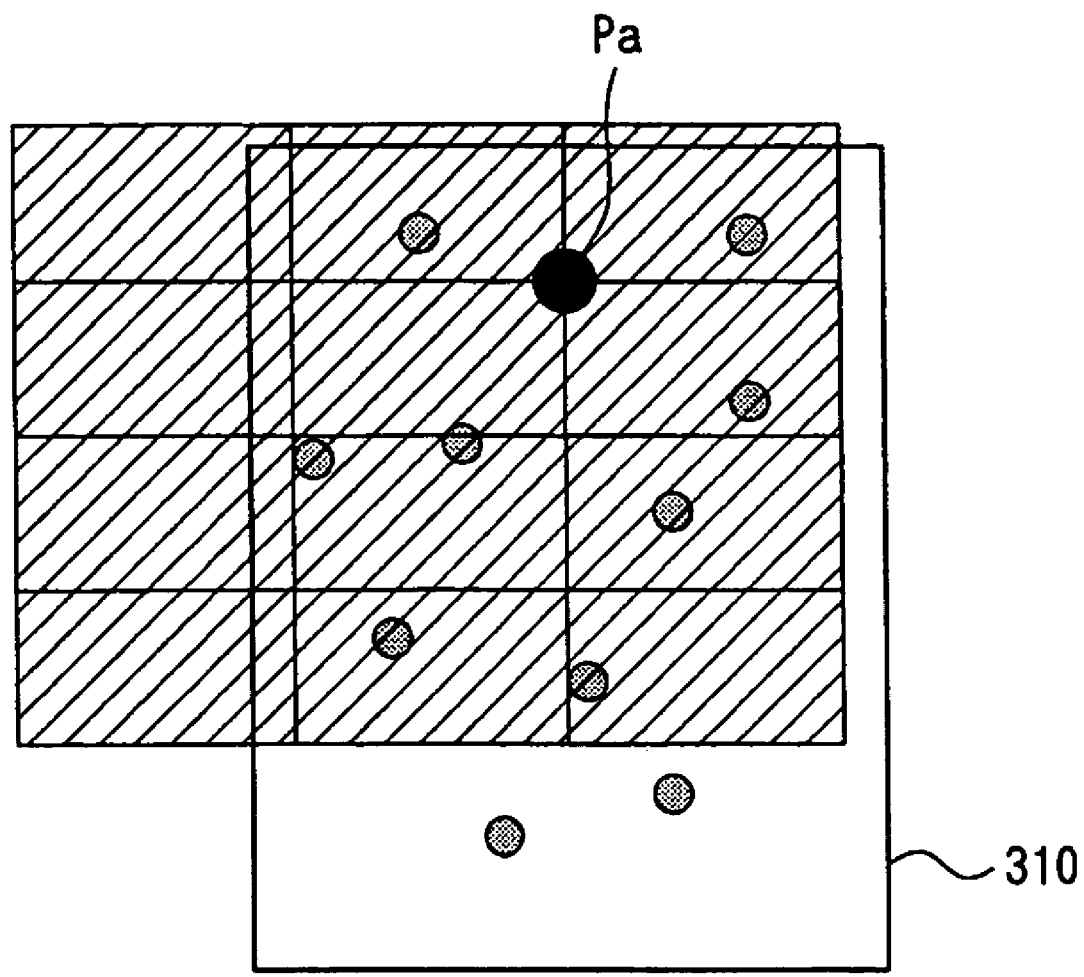
FIG. 15 is a schematic showing a case where specific regions are set as rectangular regions.

FIG. 15 is a schematic showing a case where specific regions are set as rectangular regions.

In addition, not limited to the examples of FIGS. 10 to 14, as shown in FIG. 15, for example, a plurality of rectangular regions disposed in a lattice shape around the starting point Pa are overlapped to the layout image 310, so that regions obtained by overlapping the rectangular regions with the layout image 310 are set at the specific regions.

Now, the gaze guidance directions calculation procedure of the step S112 will be described in detail with reference to FIG. 21.

In the step S112, the gaze guidance directions indicating directions of gaze-guidance from the determined starting point to the specific regions are calculated in the set specific regions.

Figure 16:
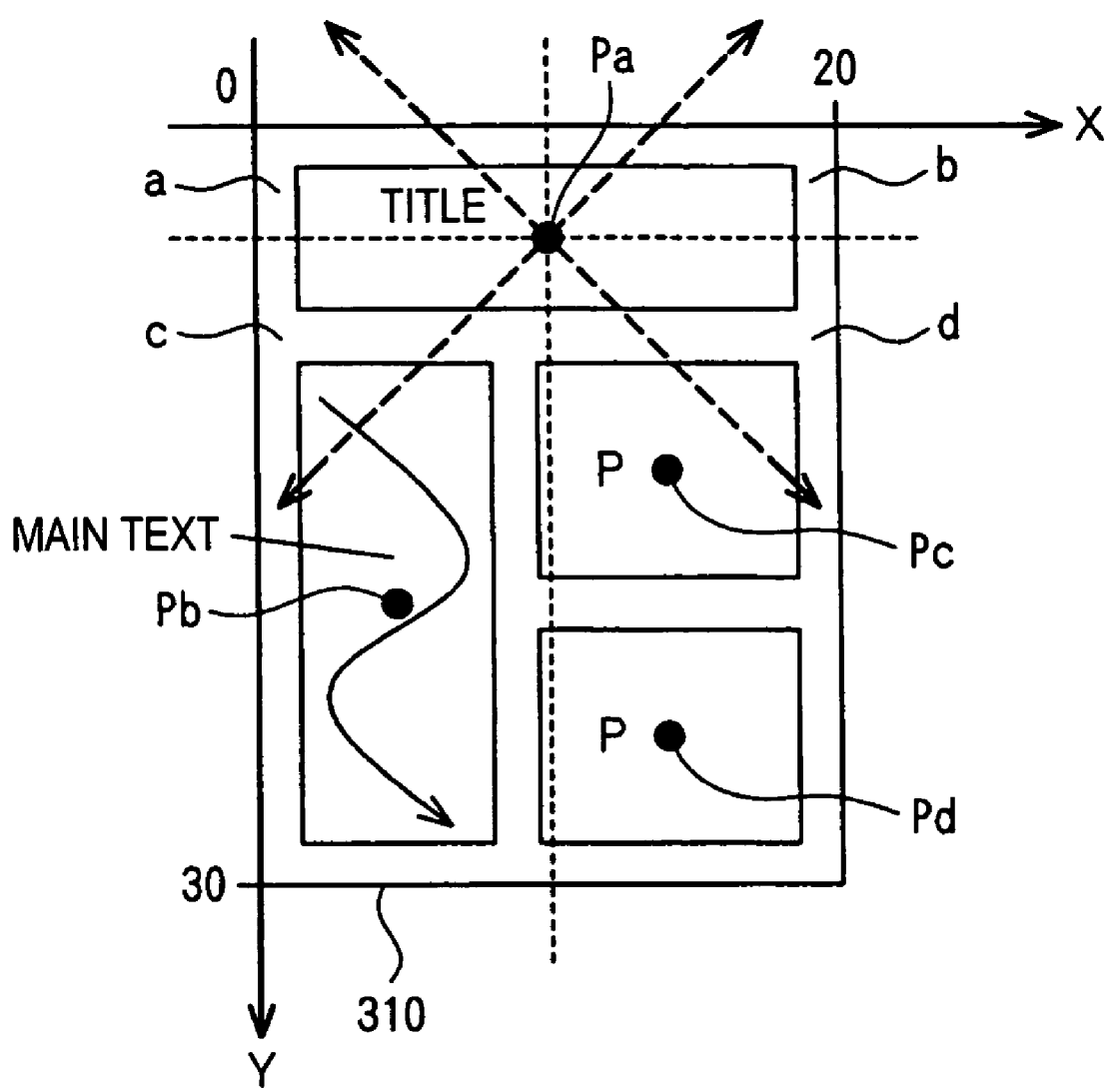
FIG. 16 is a schematic showing a case where gaze guidance directions of the specific regions in the setting example of FIG. 10 are calculated.

FIG. 16 is a schematic showing a case where gaze guidance directions of the specific regions in the setting example of FIG. 10 are calculated.

In a case where the layout image 310 is divided into four quadrants at the starting point Pa to set the specific regions, as shown in FIG. 16, for example, an angle formed by two sides of the specific region intersecting each other at the starting point Pa is bisected, so that the direction of the bisecting line may be calculated as the gaze guidance direction of the specific region. As a result, the gaze guidance direction of the specific region bisecting the second quadrant becomes the direction of the upper left 45° line as seen from the specific region a, and it can be represented by a unit vector $(-1/\sqrt{2}, 1/\sqrt{2})$. Similarly, the gaze guidance directions of the specific regions b to d can be represented by respective unit vectors $(1/\sqrt{2}, 1/\sqrt{2})$, $(-1/\sqrt{2}, -1/\sqrt{2})$, and $(1/\sqrt{2}, -1/\sqrt{2})$, respectively.

Figure 17:
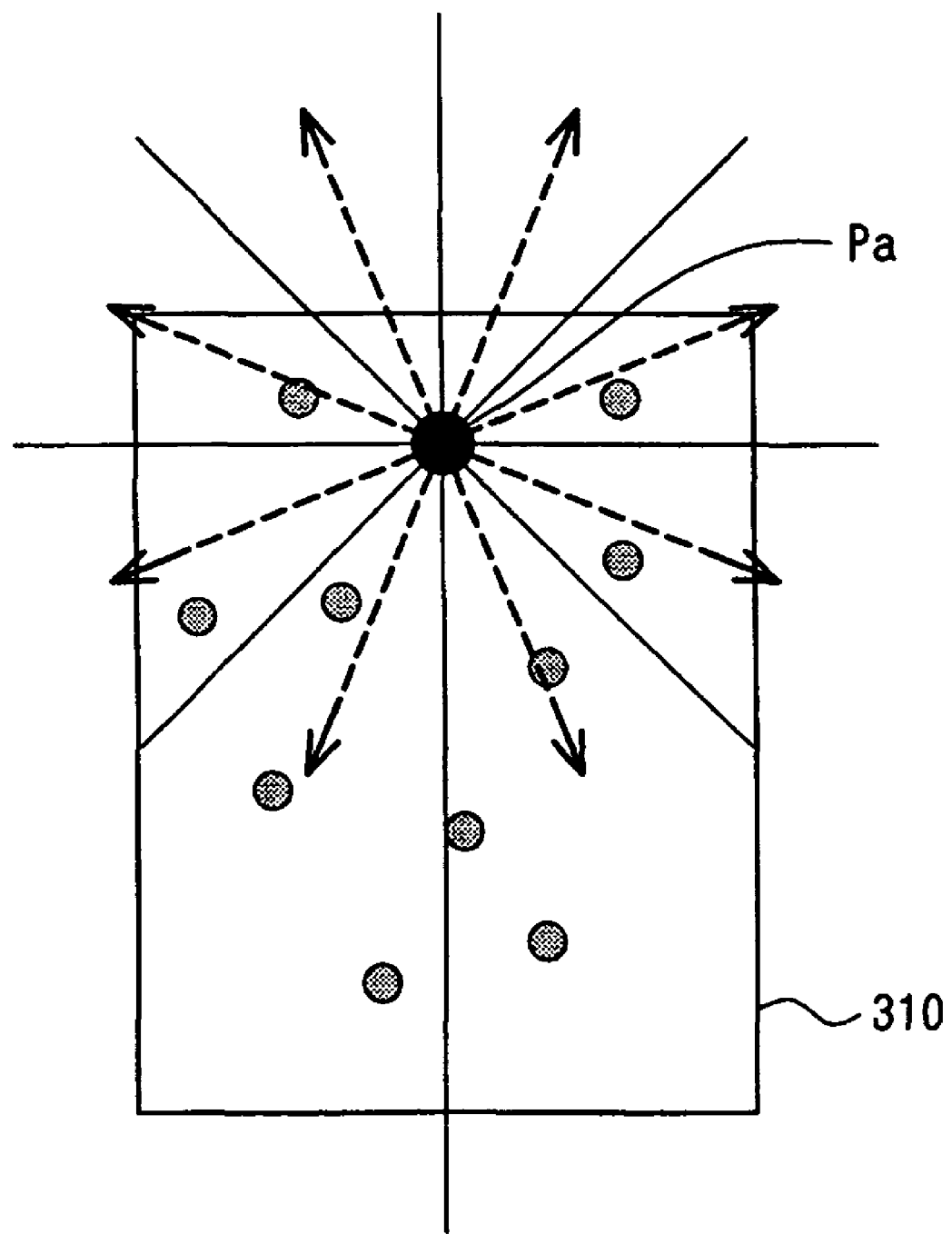
FIG. 17 is a schematic showing a case where gaze guidance directions of the specific regions in the setting example of FIG. 11 are calculated.

FIG. 17 is a schematic showing a case where gaze guidance directions of the specific regions in the setting example of FIG. 11 are calculated.

In a case where the layout image 310 is divided into eight equal parts at the starting point Pa to set the specific regions, as shown in FIG. 17, for example, an angle formed by two sides of the specific region intersecting each other at the starting point Pa is bisected, so that the direction of the bisecting line may be calculated as the gaze guidance direction of the specific region.

Figure 18:
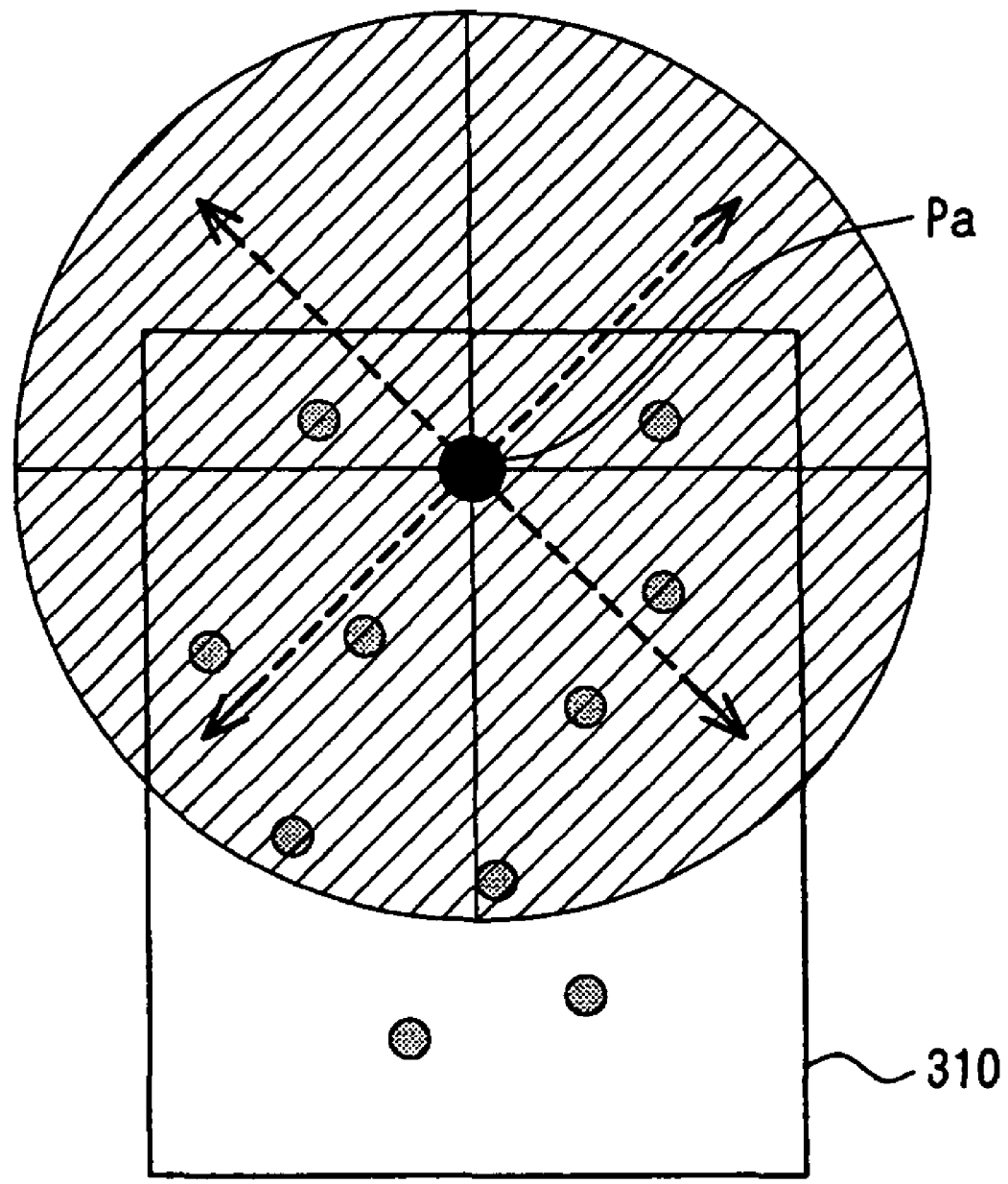
FIG. 18 is a schematic showing a case where gaze guidance directions of the specific regions in the setting example of FIG. 12 are calculated.

FIG. 18 is a schematic showing a case where gaze guidance directions of the specific regions in the setting example of FIG. 12 are calculated.

Figure 19:
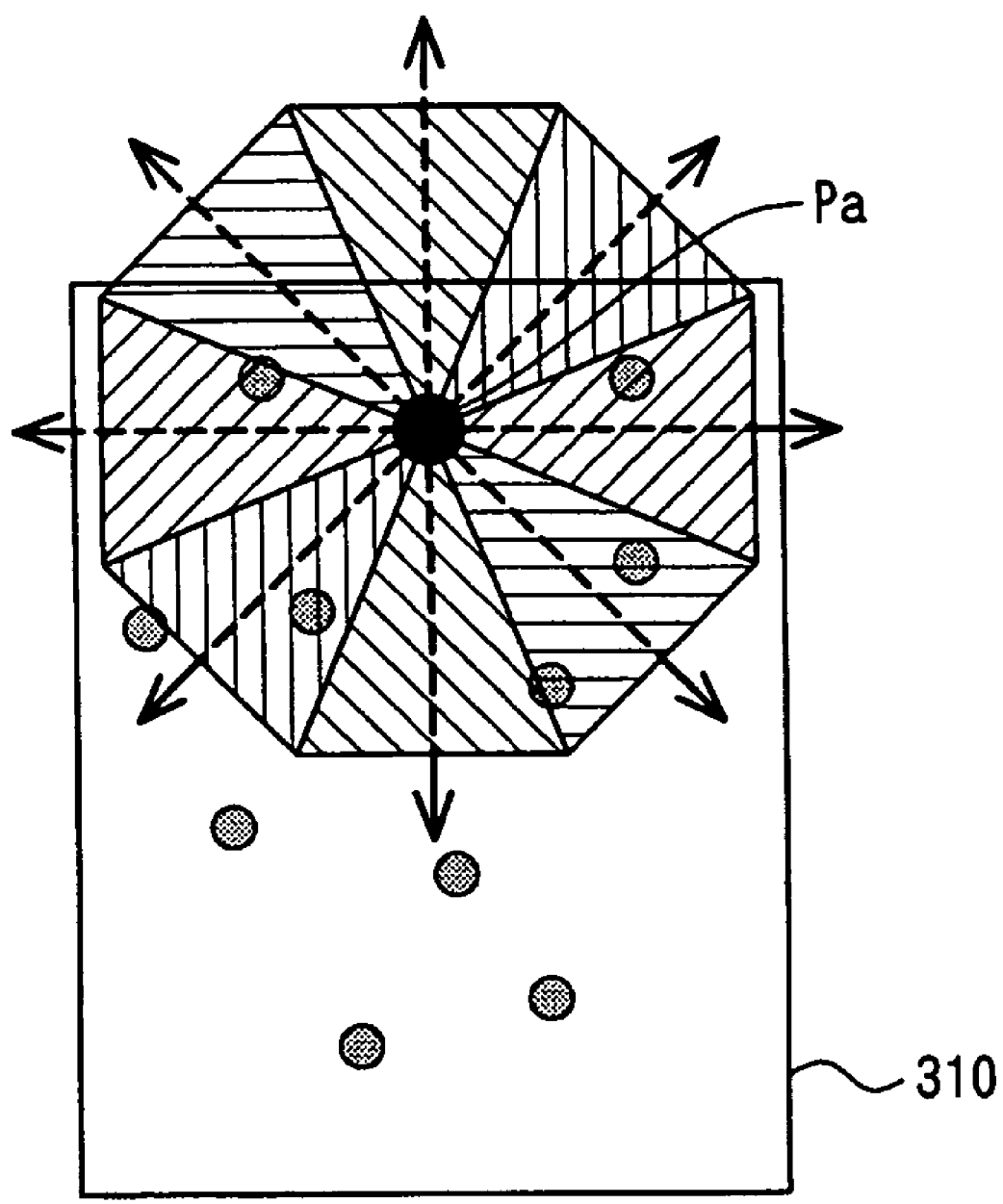
FIG. 19 is a schematic showing a case where gaze guidance directions of the specific regions in the setting example of FIG. 13 are calculated.

In a case where the fan-shaped regions are set as the specific regions, as shown in FIG. 18, for example, an angle formed by two sides of the specific region intersecting each other at the starting point Pa is bisected, so that the direction of the bisecting line may be calculated as the gaze guidance direction of the specific region FIG. 19 is a schematic showing a case where gaze guidance directions of the specific regions in the setting example of FIG. 13 are calculated.

In a case where the triangular regions are set as the specific regions, as shown in FIG. 19, for example, an angle formed by two sides of the specific region intersecting each other at the starting point Pa is bisected, so that the direction of the bisecting line may be calculated as the gaze guidance direction of the specific region.

Figure 20:
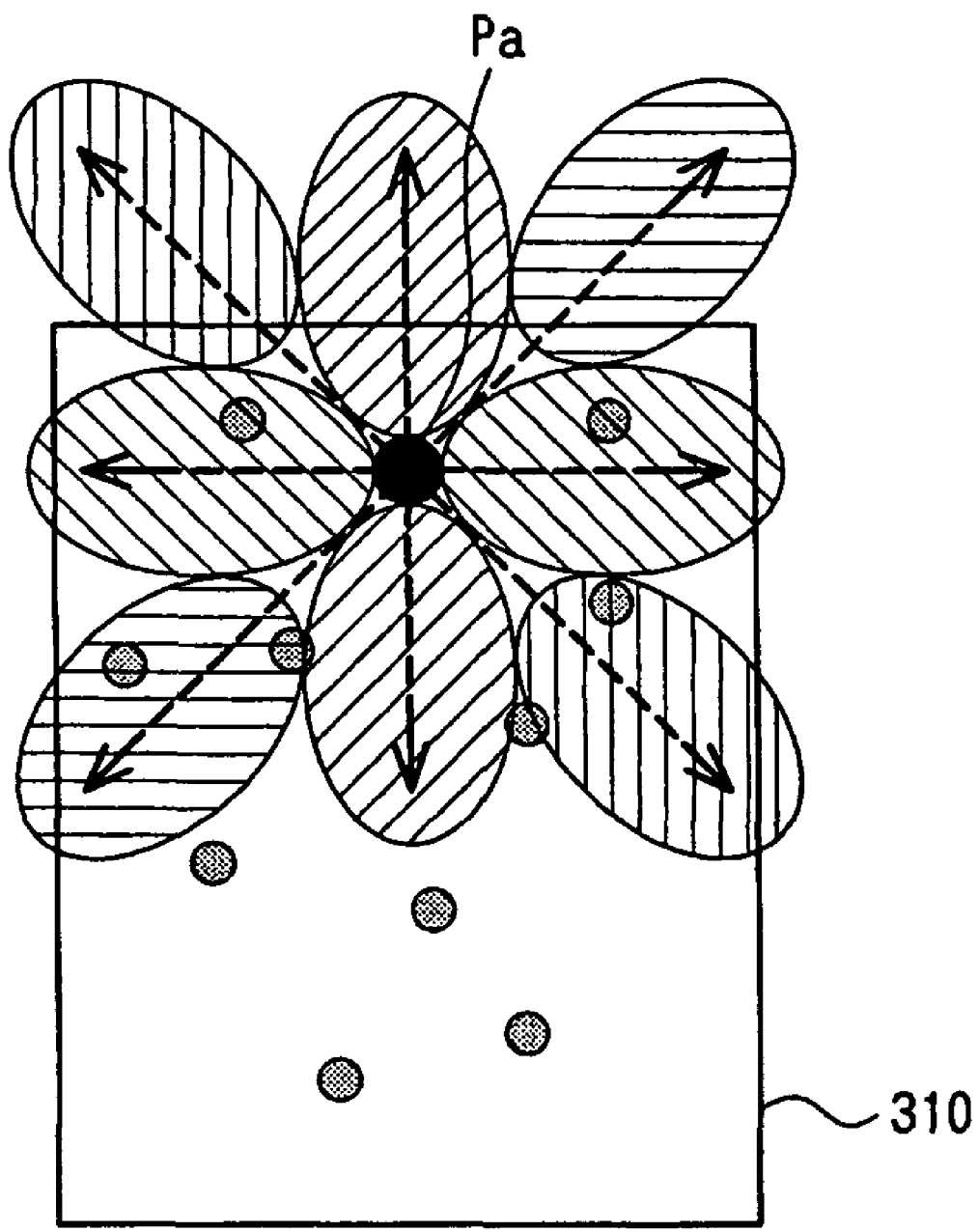
FIG. 20 is a schematic showing a case where gaze guidance directions of the specific regions in the setting example of FIG. 14 are calculated.

FIG. 20 is a schematic showing a case where gaze guidance directions of the specific regions in the setting example of FIG. 14 are calculated.

In a case where the elliptical regions are set as the specific regions, as shown in FIG. 20, for example, a direction (that is, the direction of the major axis of the elliptical region) of the straight line connecting the starting point Pa with the specific region may be calculated as the gaze guidance direction of the specific region.

Figure 21:
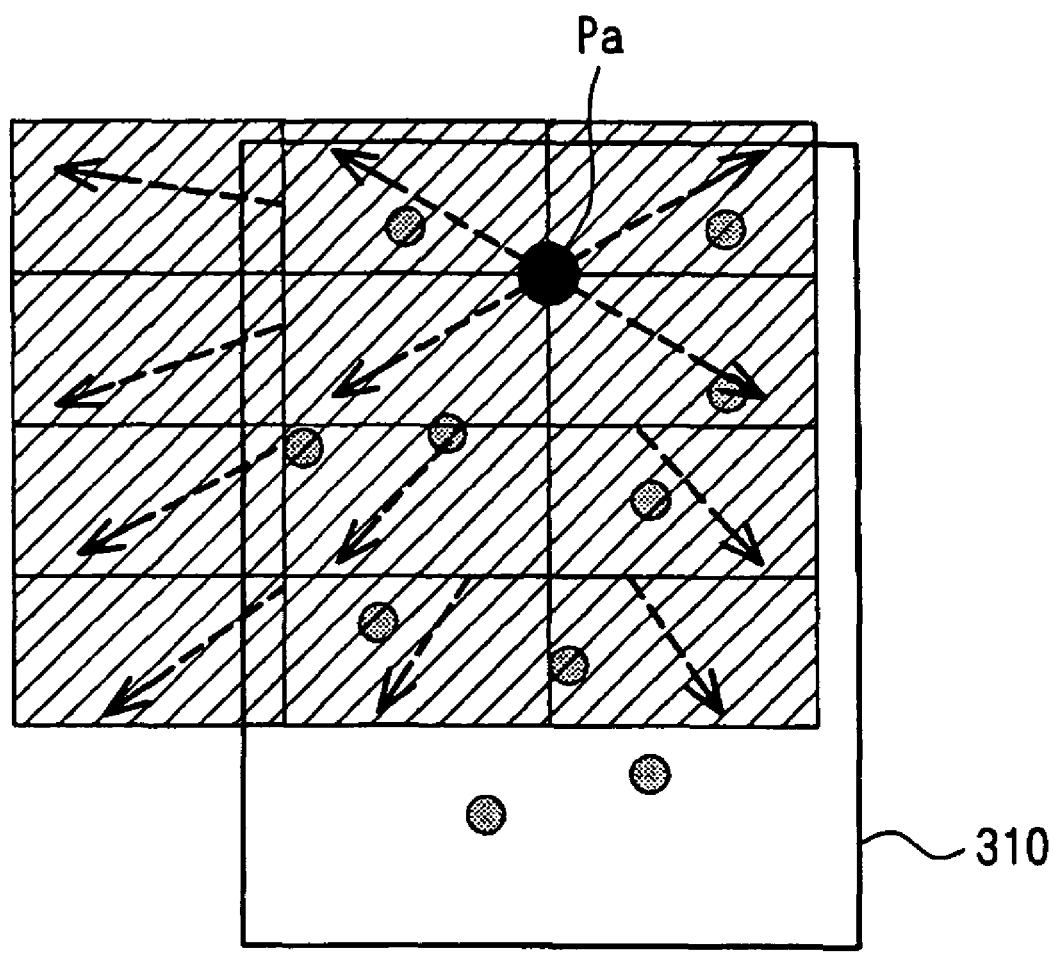
FIG. 21 is a schematic showing a case where gaze guidance directions of the specific regions in the setting example of FIG. 15 are calculated.

FIG. 21 is a schematic showing a case where gaze guidance directions of the specific regions in the setting example of FIG. 15 are calculated.

In a case where the rectangular regions are set as the specific regions, as shown in FIG. 21, for example, a direction of the straight line connecting the starting point Pa with the center of gravity of the specific region may be calculated as the gaze guidance direction of the specific region.

Now, the gaze guidance strength calculation procedure of the step S114 will be described in detail with reference to FIG. 22.

In the step S114, the gaze guidance strength indicating strength of gaze-guidance from the determined starting point to the specific regions is calculated in the specific regions.

Figure 22:
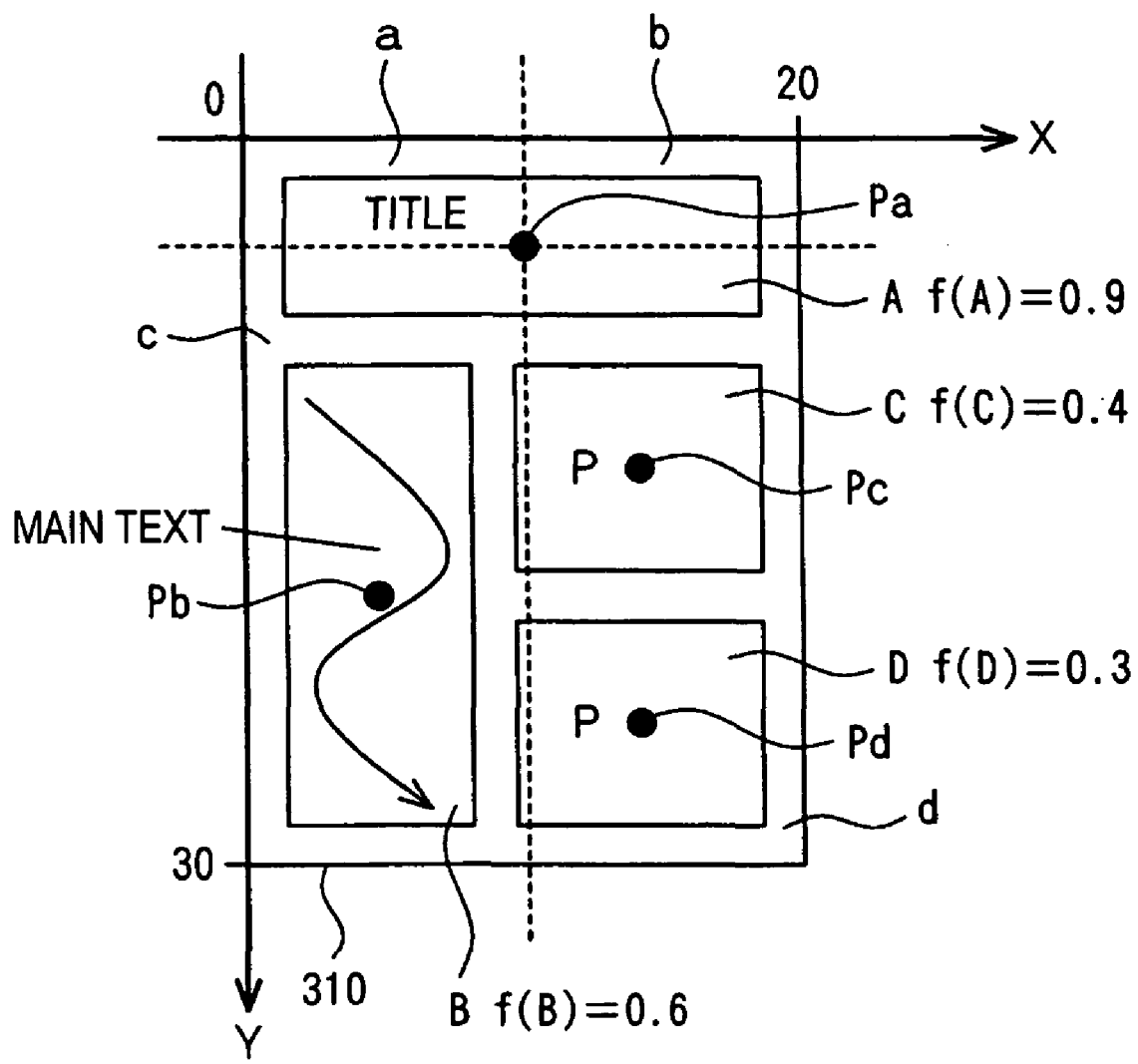
FIG. 22 is a schematic showing a case where gaze guidance strength of the specific regions is calculated.

FIG. 22 is a schematic showing a case where the gaze guidance strength of the specific regions is calculated.

In a case where the gaze guidance strength is calculated, as shown in FIG. 22, a sum of the gaze guidance strength of the representative points (excluding the starting point) in the specific regions may be calculated as the gaze guidance strength. As a result, since there is no representative point in the specific regions a and b, the gaze guidance strength thereof is calculated as "0", respectively. On the contrary, since the representative point Pb exists in the specific regions c, the gaze guidance strength thereof is calculated as "0.6". In addition, since the representative points Pc and Pd exist in the specific regions d, the gaze guidance strength thereof is calculated as "0.7 (=0.4+0.3)".

Now, the gaze guidance degree generation procedure of the step S116 will be described in detail with reference to FIGS. 23 and 24.

In the step S116, the gaze guidance degrees indicating degrees of gaze-guidance from the determined starting point to the specific regions are generated in the specific regions.

Figure 23:
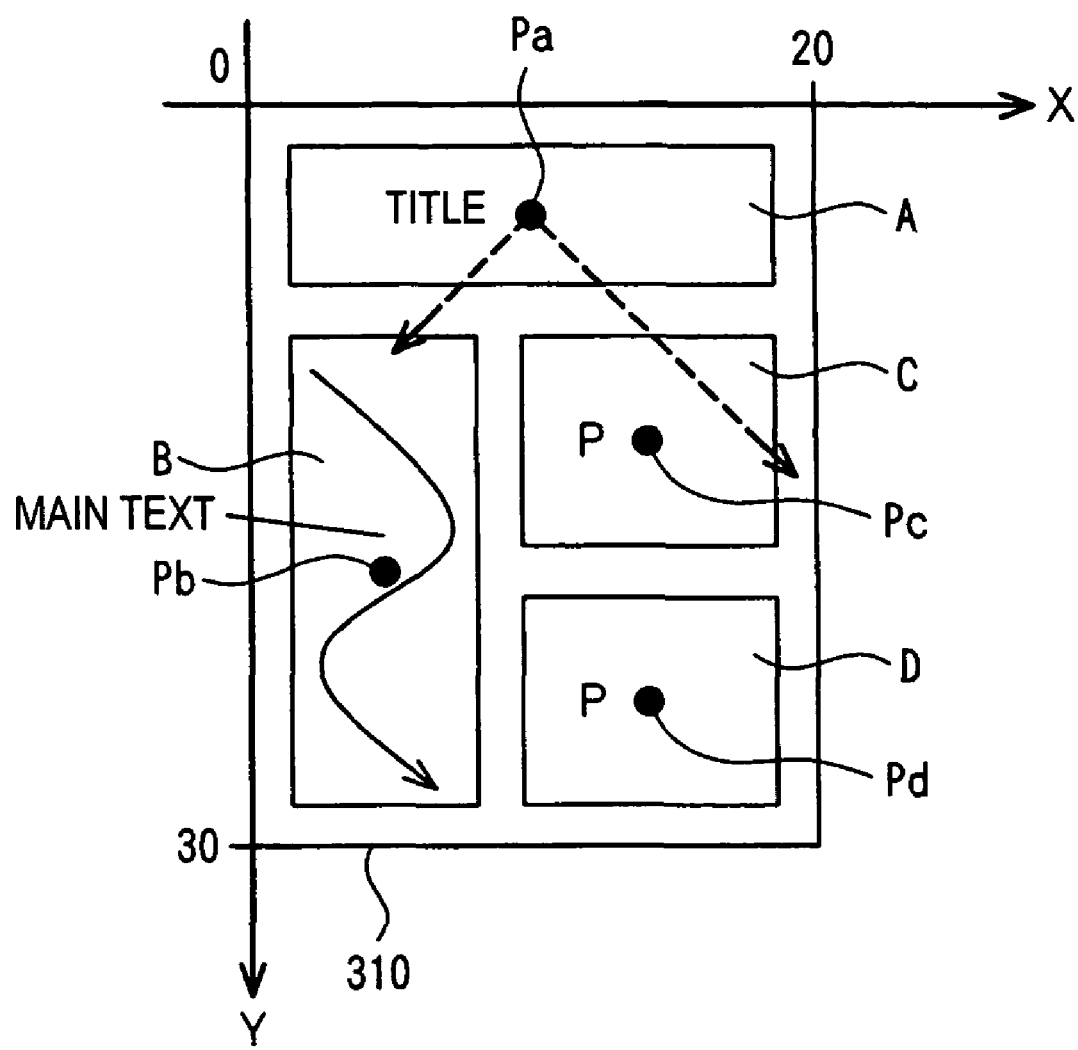
FIG. 23 is a schematic showing a case where gaze guidance degrees are calculated.

FIG. 23 is a schematic showing a case where the gaze guidance degrees are calculated.

The gaze guidance degrees of the specific regions can be generated from vectors obtained from the gaze guidance directions and the gaze guidance strength of the specific regions, as shown in FIG. 23. As a result, since the vector to the specific region d is the largest one, the gaze can be easily guided from the starting point Pa to the segmented regions C and D in comparison to the segmented region B.

FIG. 24 is a schematic showing a gaze guidance degree calculated according to only gaze attraction strength without consideration of positions of layout elements.

In a case where the position of the layout elements are not considered, the gaze guidance degrees of the segmented regions may be generated from vectors obtained from the gaze guidance directions and the gaze guidance strength of the segmented regions, as shown in FIG. 24. As a result, since the vector to the segmented region B is the largest one, it can be understood that the gaze can be easily guided from the starting point Pa to the segmented region B. However, in a case where a plurality of the layout elements group in a predetermined direction as seen from the starting point Pa, movement of the gaze with consideration of the group cannot be perceived.

Now, operations of exemplary embodiments of the present invention will be described.

In the layout apparatus 100, in the steps S100 and s200, image data is read out, and a layout image is segmented into a plurality of regions based on the read-out image. Next, in the steps S104 and S106, the positions of the representative points and gaze guidance strength of the segmented regions are calculated.

Next, in the steps S108 and S110, a representative point of a segmented region having the largest gaze attraction strength among the plurality of representative points in the layout image is determined to be the starting point, and a plurality of the specific regions are set in the layout image with reference to the starting point. Next, in the steps S112 to 116, the gaze guidance directions and the gaze guidance strength of the specific regions are calculated, and the gaze guidance degrees are calculated based on the calculated gaze guidance directions and gaze guidance strength. The gaze guidance degrees are represented by vectors indicating degrees of gaze-guidance from the starting point to the specific regions.

A function of displaying the gaze guidance degrees may be incorporated into, for example, an edit supporting function in a layout application. If an editor uses the function of displaying the gaze guidance degrees in "layout" of the layout application, the gaze guidance degrees are displayed on the arranged layout elements in the "layout" stage, so that a layout easily-readable with reference to the gaze guidance degree can be implemented.

In this way, in the exemplary embodiment, a layout image is segmented into a plurality of regions, positions of representative points and gaze attraction strength of the segmented regions are calculated, a plurality of specific regions are set in the layout image, and gaze guidance degrees indicating degrees of gaze-guidance from a starting point to the specific regions are generated based on the gaze attraction strength of the representative points in the specific regions are generated in the specific regions.

Accordingly, a direction in which gaze is easily guided in a layout image can be quantitatively calculated independent of editor's subjectivity. In addition, since the gaze guidance degree is generated based on the positions of the representative points as well as the gaze attraction strength, a degree of gaze-guidance from the starting point can be relatively properly calculated. Therefore, a relatively proper eye-flow can be quantitatively obtained in comparison to related art techniques.

In addition, since it is not necessary to install an additional device such as an eye camera, the apparatus is neither oversized nor expensive, a compact and low-cost apparatus can be implemented in comparison to a related art apparatus.

In addition, since the gaze guidance degree is not generated by such a "learning" method, a proper eye-flow can be relatively surely obtained.

In addition, in the exemplary embodiment, the specific regions are set based on the position of the starting point.

Accordingly, since the specific regions are set based on the position of the starting point, a degree of gaze-guidance from the starting point can be relatively properly calculated.

In addition, in the exemplary embodiment, a region surrounded by straight lines, curved lines, arcs, or other segmented lines or a region surrounded by rectangle, circle, ellipse or a geometrical shape is set as the specific region.

Therefore, the specific region can be relatively easily set.

In addition, in the exemplary embodiment, a predetermined direction from the starting point is calculated as the gaze guidance direction.

Accordingly, the gaze guidance direction can be relatively easily calculated.

In addition, in the exemplary embodiment, gaze guidance strength is calculated based on gaze attraction strength of representative points in the specific regions.

Accordingly, the gaze guidance strength can be reasonably calculated.

In addition, in the exemplary embodiment, gaze guidance directions and gaze guidance strength corresponding to a plurality of the specific regions of a layout image are calculated, and the calculated gaze guidance directions and gaze attraction strength of the specific regions are generated as the gaze guidance degrees thereof.

Accordingly, degrees of gaze-guidance from the starting point to the specific regions can be obtained in the specific regions.

In the first exemplary embodiment, the CPU 30 corresponds to the arithmetic device of Exemplary Aspect 41 or 43, the step S104 corresponds to the representative-point position acquisition device of Exemplary Aspect 2 or the representative-point position acquisition step of Aspect 15, 28, 42 or 43, and the step S106 corresponds to the gaze attraction strength acquisition device of Exemplary Aspect 2 or the gaze attraction strength acquisition step of Aspect 15, 28, 42 or 43. In addition, the step S110 corresponds to the specific region setting device of Exemplary Aspect 3 or 4 or the specific region setting step of Exemplary Aspect 16, 17, 29, 30, 44 or 45, and the step S112 corresponds to the gaze guidance direction calculation device of Exemplary Aspect 5 or 6 or the gaze guidance direction calculation step of Aspect 18, 19, 31, 32, 46 or 47.

In addition, in the first exemplary embodiment, the step S114 corresponds to the gaze guidance strength calculation device of Exemplary Aspect 5 or 9 or the gaze guidance strength calculation step of Exemplary Aspect 18, 22, 31, 35, 46 or 50, and the steps S112 to 116 correspond to the gaze guidance degree calculation device of Exemplary Aspect 2, 3, 5 or 11 or the gaze guidance degree if Aspect 15, 16, 18, 24, 28, 29, 31, 37, 42 to 44, 46 or 52. In addition, the segmented region corresponds to the object of Exemplary Aspect 1, 2, 12 to 15, 25 to 28, 38 to 43, 53 or 54.

Now, a second exemplary embodiment of the present invention will be described with reference to the drawings. FIGS. 25 to 31 are schematics showing the second exemplary embodiment of a gaze guidance degree calculation system, a gaze guidance degree calculation program, a storage medium, and a gaze guidance degree calculation method according to exemplary embodiments of the present invention.

In the exemplary embodiment, the gaze guidance degree calculation system, the gaze guidance degree calculation program, the storage medium, and the gaze guidance degree calculation method according to exemplary embodiments of the present invention are applied to a case where a gaze guidance degree indicating a direction and strength of gaze-guidance from a predetermined starting point is calculated. The difference from the first exemplary embodiment is that a gaze guidance direction and gaze guidance strength are calculated based on positions and gaze attraction strength of representative points. In addition, only the difference from the first exemplary embodiment will be described below, the same components as those of the first exemplary embodiment will be indicated by the same reference numerals, and description thereon will be omitted.

Figures 25, 26:
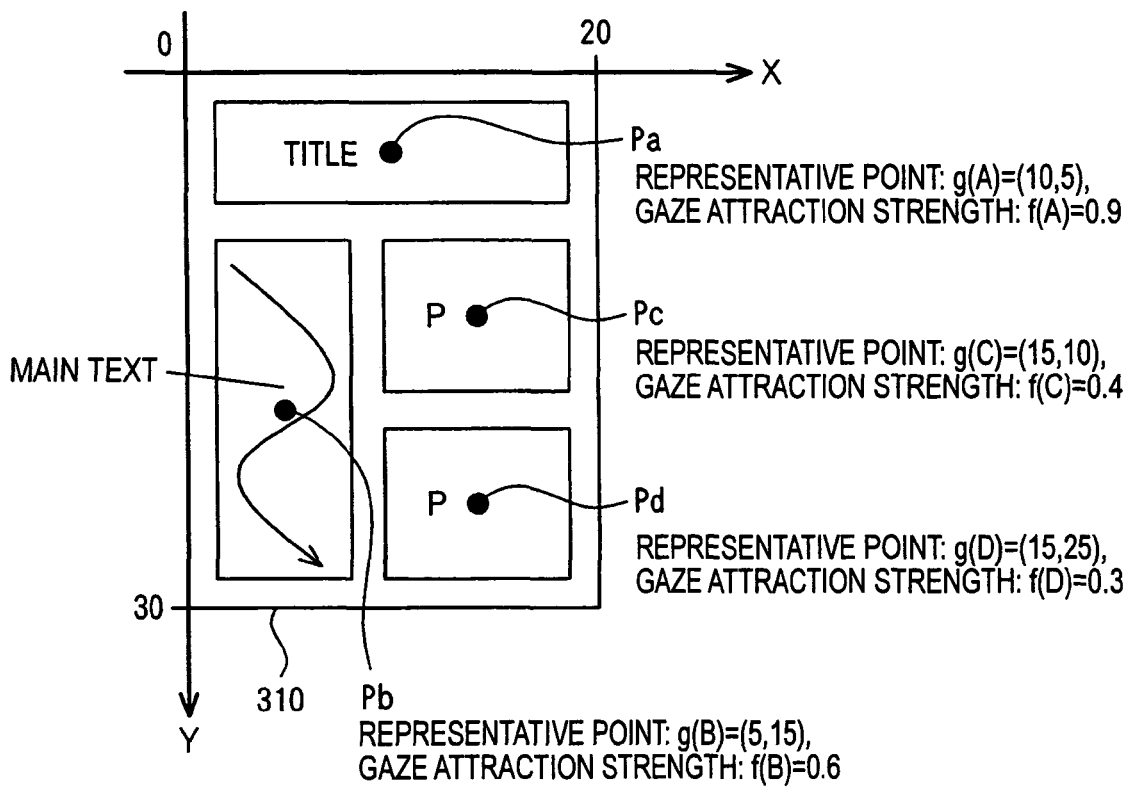
FIG. 25 is a schematic showing results of calculation of positions and gaze attraction strength at representative points of segmented regions.
FIG. 26 is a table showing positions and gaze attraction strength at representative points of segmented regions.

FIG. 25 is a schematic showing results of calculation of positions and gaze attraction strength at representative points of segmented regions.

When the procedures of the steps S104 and S106 on the layout image 310 are completed, the obtained positions and gaze attraction strength of the representative points Pa to Pd of the segmented regions A, B, C, and D are (10, 5) and "0.9", (5, 15) and "0.6", (15, 10) and "0.4", and (15, 25) and "0.3", respectively.

FIG. 26 is a table showing positions and gaze attraction strength at representative points of segmented regions.

FIG. 26 is a table of listing the results of the FIG. 25. Here, the representative points Pa to Pd are disposed in a three-dimensional space in a rectangular coordinate system. The representative points Pa to Pd are disposed in the three-dimensional space in the rectangular coordinate system by allocating the first elements, the second elements, and the gaze attraction strength of the representative points to the X, Y, and Z axes, respectively.

Next, for all the combination obtained by selecting two points among the representative points Pa to Pd, Euclidean distances D between representative points are calculated by the following Equation 1. In the following Equation 1, αx, αy, and αz denote respective coordinates of the one of the representative points from which the Euclidean distance D is calculated, and βx, βy, and βz denote respective coordinates of the other.

[Equation 1]

$$D(\alpha, \beta) = \sqrt{(\alpha_x - \beta_x)^2 + (\alpha_y - \beta_y)^2 + (\alpha_z - \beta_z)^2} \quad (1)$$

FIG. 27 is a table showing distances between representative points of segmented regions.

The Euclidean distances between the representative point Pa and the representative points Pb to Pd are "11.18", "7.07" and "20.61", respectively. In addition, the Euclidean distances between the representative point Pb and the representative points Pc and Pd are "11.18" and "14.14", respectively. In addition, the Euclidean distance between the representative point Pc and the representative point Pd is "15.00".

FIG. 28 is a table showing directional components and magnitudes of vectors from a starting point Pa to representative points Pb to Pd.

Next, vectors from the representative points Pa to Pd to the starting point Pa are obtained based on the results of FIG. 25 to 27. Here, the directions of the vectors are the directions from the starting point Pa to the representative points Pa to Pd, and the magnitudes of the vectors are the Euclidean distances between the starting point Pa and the representative points Pa to Pd. Therefore, as shown in FIG. 28, the direction and magnitude of the vector Pab from the starting point Pa to the representative point Pb are (−5, 10) and "11.18". Similarly, the direction and magnitude of the vector Pac from the starting point Pa to the representative point Pc are (5, 5) and "7.07", and the direction and magnitude of the vector Pad from the starting point Pa to the representative point Pd are (5, 20) and "20.61".

Figure 29:
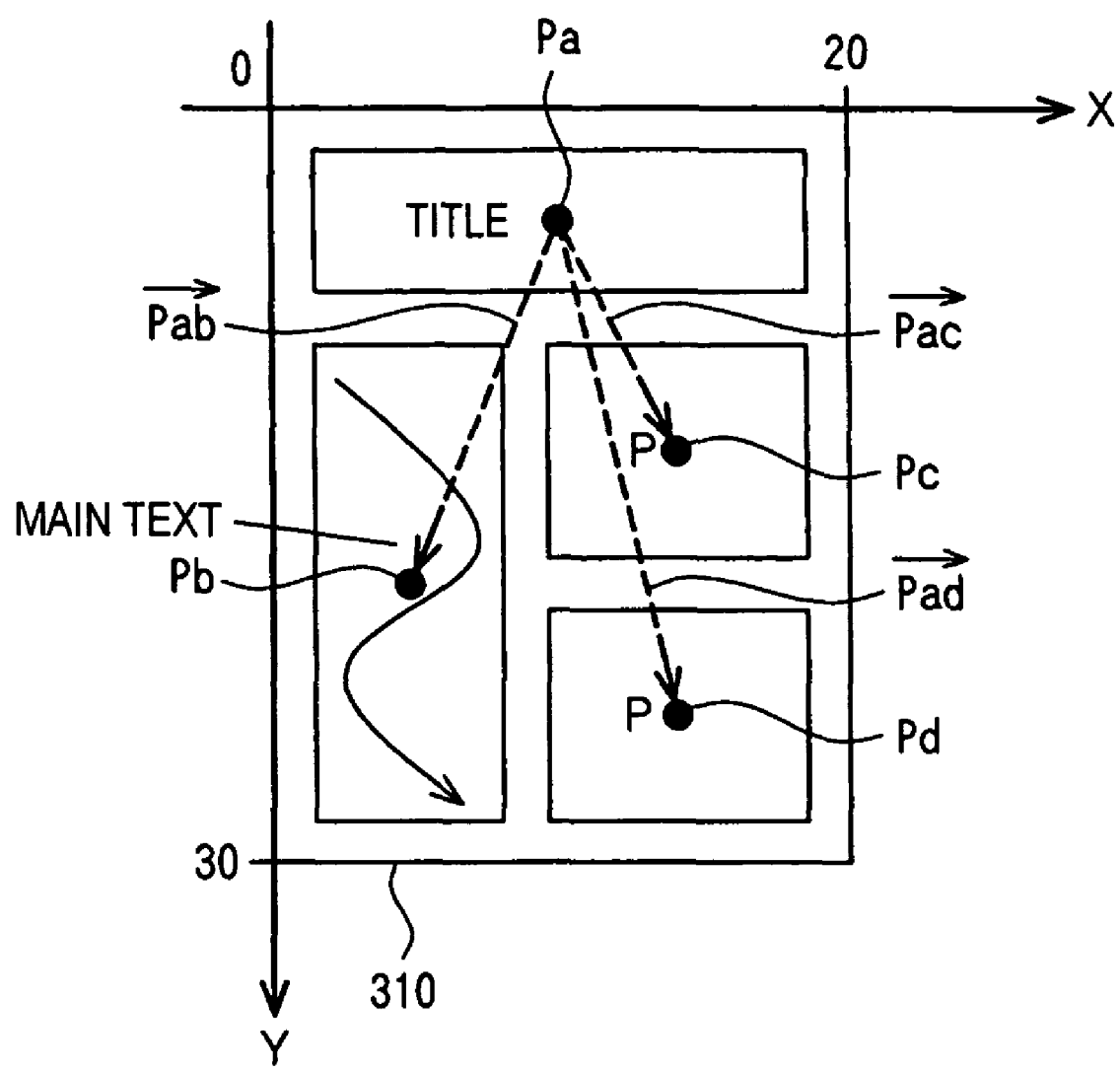
FIG. 29 is a schematic showing vectors from a starting point Pa to representative points Pb to Pd.

FIG. 29 is a schematic showing vectors from a starting point Pa to representative points Pb to Pd.

The vectors Pab, Pac, and Pad are displayed on the layout image 310 as shown in FIG. 29.

Figures 30, 31:
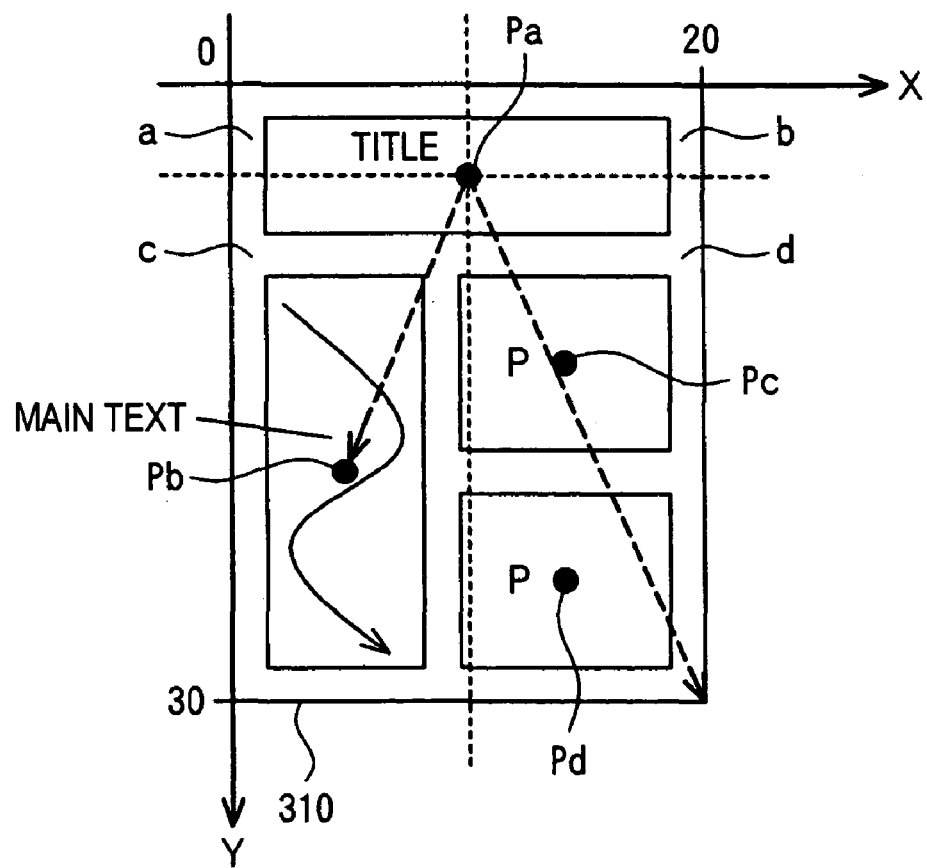
FIG. 30 is a table showing results of calculation of gaze guidance directions and gaze guidance strength of specific regions.
FIG. 31 is a schematic showing a case where a gaze guidance degree is generated.

FIG. 30 is a table showing results of calculation of gaze guidance directions and gaze guidance strength of specific regions.

In the gaze guidance direction and strength calculation procedures of the steps S112 and S114, since there is no representative point in the specific regions a and b, the gaze guidance strength thereof is "0", respectively. On the contrary, since the representative point Pb exists in the specific region c, the gaze guidance direction and strength are calculated as the vector Pab, which has (−5, 10) and "11.18", as shown in FIG. 30. In addition, since the representative points Pc and Pd exist in the specific region d, the gaze guidance direction and strength are calculated as a composition vector of the vectors Pac and Pad, which has (−5, 10) and "11.18".

FIG. 31 is a schematic showing a case where a gaze guidance degree is generated.

In the gaze guidance degree generation procedure of the step S116, the gaze guidance degrees of the specific regions may be generated from vectors obtained from the gaze guidance directions and the gaze guidance strength of the specific regions, as shown in FIG. 31. As a result, since the vector to the specific region d is the largest one, it can be understood that the gaze can be easily guided from the starting point Pa to the specific regions c and d in comparison to the specific regions b. Compared with the result of FIG. 23, the angle between the vector to the specific region c and the vector to the specific region d becomes smaller, and the magnitudes of the vectors to the specific regions c and d become larger.

Now, operations of the exemplary embodiment will be described. In the layout apparatus 100, in the steps S104 and S106, the positions of the representative points and gaze guidance strength of the segmented regions are calculated. Next, the representative points are disposed in the three-dimensional space in the rectangular coordinate system, the Euclidean distances between the representative points are calculated, and the vectors from the starting point to the representative points are obtained based on the calculated positions of the representative points and the Euclidean distances. Next, in the steps S112 to S116, the composition vector of the vectors from the starting point to the representative points in the specific regions is calculated as the gaze guidance direction and gaze guidance strength, and the gaze guidance degree is generated based on the calculated gaze guidance direction and the gaze guidance strength.

In this way, in the exemplary embodiment, the gaze guidance direction is calculated based on the position of the starting point and the positions of the representative points in the specific regions.

Accordingly, the gaze guidance direction can be relatively reasonably calculated. In addition, in the exemplary embodiment, in a case where a plurality of representative points exist in specific regions, the gaze guidance strength can be calculated based on statistical values of the positions and gaze attraction strength of the representative points.

Accordingly, since the gaze guidance strength is calculated with consideration of the positions and gaze attraction strength of the plurality of representative points in the specific regions, the gaze guidance strength can be relatively reasonably calculated.

In the second exemplary embodiment, the step S112 corresponds to the gaze guidance direction calculation device of Exemplary Aspect 7 or the gaze guidance direction calculation step of Exemplary Aspect 20, 33 or 48, and the step S114 corresponds to the gaze guidance strength calculation device of Exemplary Aspect 10 or the gaze guidance strength calculation step of Exemplary Aspect 23, 36 or 51.

Now, a third exemplary embodiment of the present invention will be described with reference to the drawings. FIGS. 32 to 37 are views showing the third exemplary embodiment of a gaze guidance degree calculation system, a gaze guidance degree calculation program, a storage medium, and a gaze guidance degree calculation method according to exemplary embodiments of the present invention.

In the exemplary embodiment, the gaze guidance degree calculation system, the gaze guidance degree calculation program, the storage medium, and the gaze guidance degree calculation method according to exemplary embodiments of the present invention are applied to a case where a gaze guidance degree indicating a direction and strength of gaze-guidance from a predetermined starting point is calculated. The difference from the second exemplary embodiment is that a gaze guidance direction and gaze guidance strength are calculated based on positions and gaze attraction strength of representative points. In addition, only the difference from the second exemplary embodiment will be described below, the same components as those of the second exemplary embodiment will be indicated by the same reference numerals, and description thereon will be omitted.

FIG. 32 is a table showing directional components and magnitudes of vectors from a starting point Pa to representative points Pb to Pd.

Although the Euclidean distances between the starting point Pa and the representative points Pb to Pd are defined as the magnitudes of the vectors Pab, Pac, and Pad in the second exemplary embodiment, the gaze attraction strength of the representative points Pb to Pd are defined as the magnitudes of the vectors Pab, Pac, and Pad in the exemplary embodiment. As a result, as shown in FIG. 32, the direction and the magnitude of the vector Pab are (−5, 10) and "0.6", respectively. Similarly, the direction and the magnitude of the vector Pac are (5, 5) and "0.4", respectively, and the direction and the magnitude of the vector Pad are (5, 20) and "0.3", respectively.

However, in this situation, since the scale of the directional components of the vectors Pab, Pac, and Pad are different from the scale of the magnitudes of the vectors Pab, Pac, and Pad, it is difficult to perceive display on the layout image 310.

FIG. 33 is a table showing a result of adjusting the directional components and magnitudes of the vectors Pab, Pac, and Pad in an equal scale.

If the ratio of the magnitudes of the vectors Pab, Pac, and Pad are maintained, the results are not affected. Therefore, in order to adjust the directional components and magnitudes of the vectors Pab, Pac, and Pad in the equal scale, the magnitudes of the vectors Pab, Pac, and Pad are magnified 10 times, as shown in FIG. 33.

FIG. 34 is a table showing a result of normalization of vectors Pab, Pac, and Pad.

Since the directional components and magnitudes from the starting point Pa are separately shown in the result of FIG. 33, the directional components and magnitudes of the vectors Pab, Pac, and Pad are normalized to be equal to each other. Therefore, as shown in FIG. 34, the directional component and magnitude of the vector Pab become (−2.7, 5.4) and "6", respectively. Similarly, the directional component and magnitude of the vector Pac become (2.8, 2.8) and "4", respectively, and the directional component and magnitude of the vector Pad become (0.7, 2.9) and "3", respectively.

Figures 35, 36:
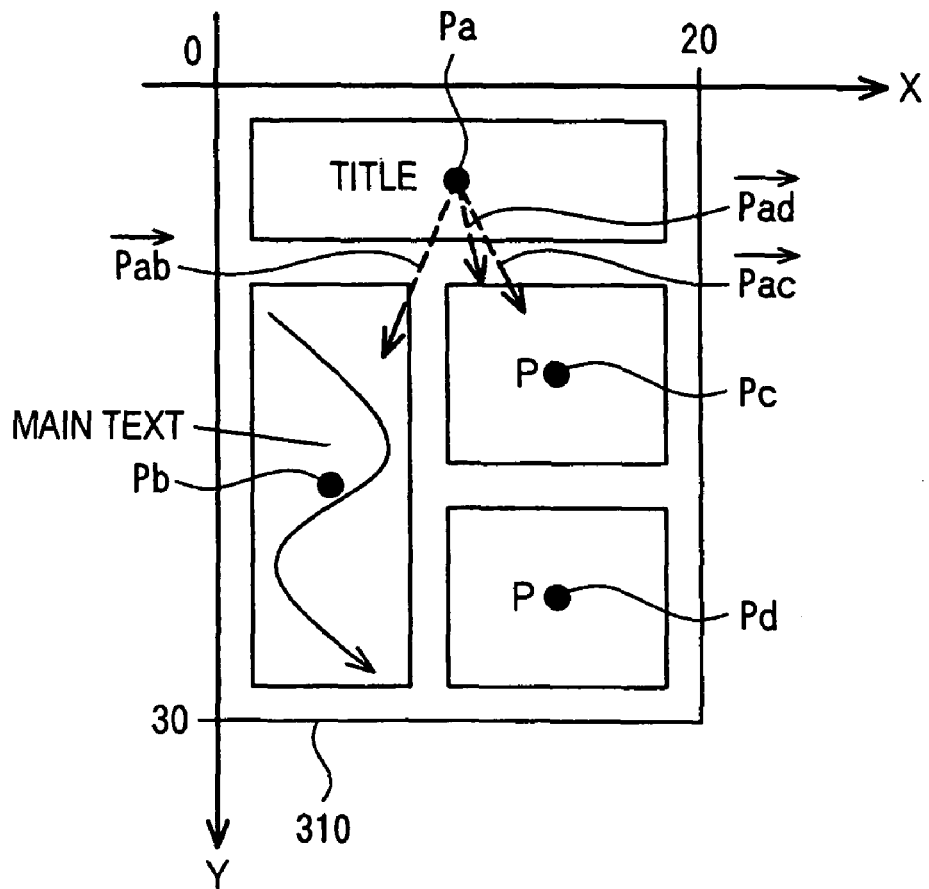
FIG. 35 is a schematic showing vectors from a starting point Pa to representative points Pb to Pd.
FIG. 36 is a table showing results of calculation of gaze guidance directions and gaze guidance strength of specific regions.

FIG. 35 is a schematic showing vectors from a starting point Pa to representative points Pb to Pd.

The vectors Pab, Pac, and Pad are displayed on the layout image 310 as shown in FIG. 35.

FIG. 36 is a table showing results of calculation of gaze guidance directions and gaze guidance strength of specific regions.

In the gaze guidance direction and strength calculation procedures of the steps S112 and S114, since there is no representative point in the specific regions a and b, the gaze guidance strength thereof is "0", respectively. On the contrary, since the representative point Pb exists in the specific region c, the gaze guidance direction and strength are calculated as the vector Pab, which has (−2.7, 5.4) and "6", as shown in FIG. 36. In addition, since the representative points Pc and Pd exist in the specific region d, the gaze guidance direction and strength are calculated as a composition vector of the vectors Pac and Pad, which has (3.5, 5.7) and 6.9".

Figure 37:
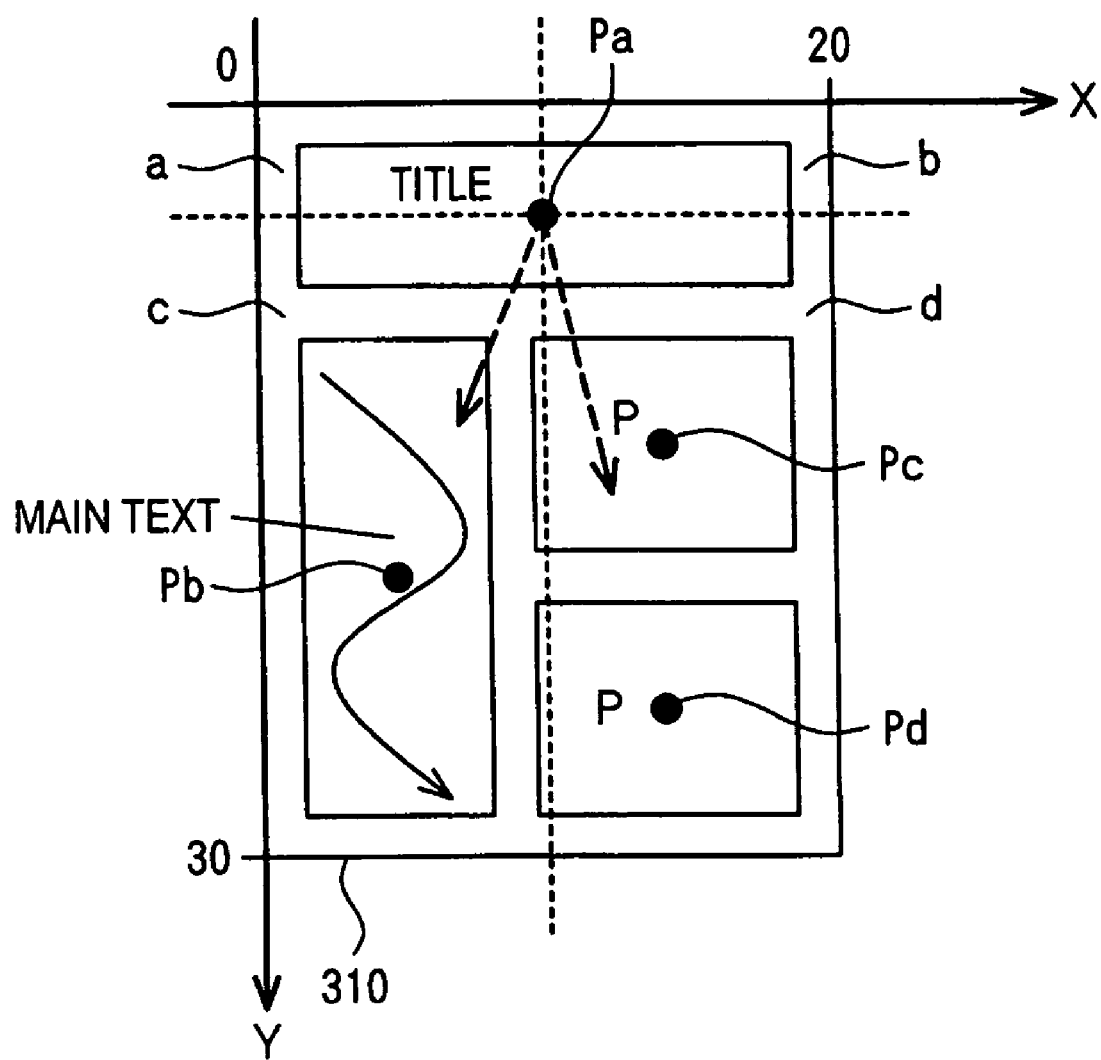
FIG. 37 is a schematic showing a case where a gaze guidance degree is generated.

FIG. 37 is a schematic showing a case where a gaze guidance degree is generated.

In the gaze guidance degree generation procedure of the step S116, the gaze guidance degrees of the specific regions may be generated from vectors obtained from the gaze guidance directions and the gaze guidance strength of the specific regions, as shown in FIG. 37. As a result, since the vector to the specific region d is the largest one, it can be understood that the gaze can be easily guided from the starting point Pa to the specific regions c and d in comparison to the specific regions b. Compared with the result of FIG. 23, the angle between the vector to the specific region c and the vector to the specific region d becomes smaller, and the magnitudes of the vectors to the specific regions c and d become larger.

Now, operations of the exemplary embodiment will be described.

In the layout apparatus 100, in the steps S104 and S106, the positions of the representative points and gaze guidance strength of the segmented regions are calculated, and the vectors from the starting point to the representative points are obtained based on the calculated positions of the representative points and the gaze attraction strength. Next, in the steps S112 to S116, the composition vector of the vectors from the starting point to the representative points in the specific regions is calculated as the gaze guidance direction and gaze guidance strength, and the gaze guidance degree is generated based on the calculated gaze guidance direction and the gaze guidance strength.

In this way, in the exemplary embodiment, the positions of the representative points and the gaze attraction strength are defined as the directional components and magnitudes of the vectors from the starting point to the representative points, respectively, the composition vector of the vectors from the starting point to the representative points in the specific regions is calculated as the gaze guidance direction and gaze guidance strength, and the gaze guidance degree is generated based on the calculated gaze guidance direction and the gaze guidance strength.

Accordingly, in comparison to the first and second exemplary embodiments, a degree of gaze-guidance from the starting point can be further properly calculated In addition, in the exemplary embodiment, the gaze guidance direction is calculated based on the position of the starting point and the positions of the representative points in the specific regions.

Accordingly, the gaze guidance direction can be relatively reasonably calculated.

In addition, in the exemplary embodiment, in a case where a plurality of representative points exist in specific regions, the gaze guidance strength can be calculated based on statistical values of the positions and gaze attraction strength of the representative points.

Accordingly, since the gaze guidance strength is calculated with consideration of the positions and the gaze attraction strength of the plurality of representative points in the specific regions, the gaze guidance strength can be relatively reasonably calculated.

In the third exemplary embodiment, the step S112 corresponds to the gaze guidance direction calculation device of Exemplary Aspect 7 or the gaze guidance direction calculation step of Exemplary Aspect 20, 33 or 48, and the step S114 corresponds to the gaze guidance strength calculation device of Exemplary Aspect 10 or the gaze guidance strength calculation step of Exemplary Aspect 23, 36 or 51.

In addition, although the gaze guidance direction is calculated based on the position of the starting point and the positions of the representative points in the specific regions in the second and third exemplary embodiments, not limited thereto, in a case where a plurality of representative points exist in specific regions, the gaze guidance direction can be calculated based on statistical values of the positions the gaze attraction strength of the representative points.

Accordingly, since the gaze guidance strength is calculated with consideration of the gaze attraction strength of the plurality of representative points in the specific regions, the gaze guidance strength can be relatively reasonably calculated.

In addition, although the scales of the directional components and magnitudes of the vectors Pab, Pac, and Pad are adjusted in an almost equal scale in the third exemplary embodiment, not limited thereto, the directional components of the vectors Pab, Pac, and Pad may be adjusted.

In addition, although the positions and gaze attraction strength of the representative points are calculated in the first to third exemplary embodiments, not limited thereto, the positions and gaze attraction strength of the representative points may be input from input units and the like, or they may be acquired from external terminal and the like.

In addition, although the segmentation of regions and the calculation of the positions and gaze attraction strength of the representative points are performed based on the image data in the first to third exemplary embodiments, not limited thereto, the segmentation of regions and the calculation of the positions and gaze attraction strength of the representative points may be performed based on document data, layout templet, two-dimensional data capable of representing a difference of height with gaze attraction strength, or other data.

Figure 38:
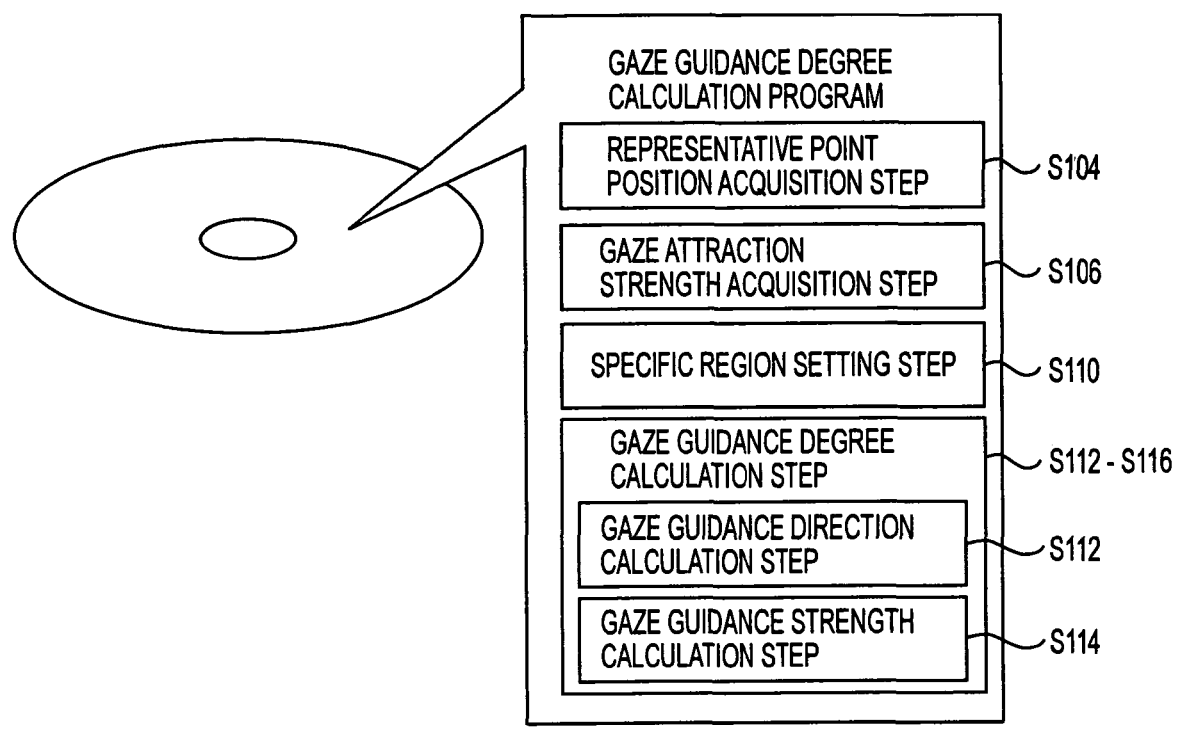
FIG. 38 is a schematic showing a storage medium and a data structure thereof.

In addition, although a case of executing the control program stored in the ROM 32 in advance to perform the procedures shown in the flowchart of FIG. 5 is described in the first to third exemplary embodiments, not limited thereto, a program including the procedures may be read out from a storage medium for storing the program in the RAM 34, and then, it may be executed as shown in FIG. 38.

FIG. 38 is a schematic showing a storage medium and a data structure thereof.

Here, the storage medium includes a semiconductor storage medium such as a RAM and a ROM, a magnetic storage medium such as an FD and an HD, an optical readable storage medium such as a CD, a CDV, an LD, and an DVD, an magnetic/optical-readable storage medium such as an MO, and any other computer-readable storage media irrespective of any reading methods such as electrical, magnetic, and optical methods.

In addition, although the gaze guidance degree calculation system, the gaze guidance degree calculation program, the storage medium, and the gaze guidance degree calculation method according to exemplary embodiments of the present invention are applied to a case where a gaze guidance degree indicating a direction and strength of gaze-guidance from a predetermined starting point is calculated in the first to third exemplary embodiments, not limited thereto, they may be applied to other case without departing from the spirit of exemplary embodiments of the present invention. More specifically, the following two cases, for example, may be proposed.

In the first case, as incorporated into modules of DTP software (layout software) or the like driven on a PC, a construction for displaying a gaze guidance degree in real-time, similar to a spelling check function of word processor software is considered.

In the second case, a construction where data (files) of the DTP software (layout softer) or the like is received and the gaze guidance degree is calculated in a batch process is considered. Finally, a construction where a user using a monitor for displaying a calculation result calculates only the gaze guidance degree may be considered. In this case, data is received from the user's PC via a network, and the calculation result is transmitted to the user's PC.

What is claimed is:

1. A gaze guidance degree calculation system for calculating a degree of gaze-guidance of a layout image based on image data, comprising:
 a starting point determination device to determine, via a processor, an eye-gazing starting point of the layout image,
 the starting point determination device segmenting the layout image into a plurality of segmented regions, calculating positions of symbolic points of each of the segmented regions, calculating initial gazing degrees of each of the segmented regions, and determining the eye-gazing starting point based on the positions of the symbolic points and the initial gazing degrees of each of the segmented regions;
 a representative-point position acquisition device to acquire a position of a representative point of an object contained in the layout image;
 a gaze attraction strength acquisition device to acquire a gaze attraction strength indicating a strength of gaze-attraction to the object; and
 a gaze guidance degree calculation device to calculate a gaze guidance degree indicating a degree of gaze-guidance of the layout image from the eye-gazing starting point based on the position of the representative point acquired by the representative-point position acquisition device and the gaze attraction strength acquired by the gaze attraction strength acquisition device, the gaze guidance degree calculation device calculating the gaze guidance degree based on the gaze attraction strength of the representative point in a specific region of the layout image.

2. The gaze guidance degree calculation system according to claim 1, further comprising:

a specific region setting device to set the specific region based on the eye-gazing starting point, the gaze guidance degree calculation device calculating the gaze guidance degree based on the gaze attraction strength of the representative point in the specific region set by the specific region setting device.

3. The gaze guidance degree calculation system according to claim 2, the specific region setting device setting a region surrounded by straight lines, curved lines, arcs, or other segmented lines or a region surrounded by rectangle, circle, ellipse or a geometrical shape, as the specific region.

4. The gaze guidance degree calculation system according to claim 1, the gaze guidance degree calculation device further including:

a gaze guidance direction calculation device to calculate a gaze guidance direction indicating a direction of gaze-guidance from the eye-gazing starting point to the specific region;

a gaze guidance strength calculation device to calculate gaze guidance strength indicating strength of gaze-guidance from the eye-gazing starting point to the specific region, the gaze guidance strength calculation device calculating the gaze guidance direction and the gaze guidance strength, which collectively represent the gaze guidance degree.

5. The gaze guidance degree calculation system according to claim 4, the gaze guidance direction calculation device calculating a predetermined direction from the eye-gazing starting point as the gaze guidance direction.

6. The gaze guidance degree calculation system according to claim 4, the gaze guidance direction calculation device calculating the gaze guidance direction based on the eye-gazing starting point and the position of the representative point in the specific region.

7. The gaze guidance degree calculation system according to claim 4, a plurality of the representative points existing in the specific region, and the gaze guidance direction calculation device calculating the gaze guidance direction based on a statistical value of gaze attraction strength of the representative points.

8. The gaze guidance degree calculation system according to claim 4, the gaze guidance strength calculation device calculating the gaze guidance strength based on the gaze attraction strength of the representative point in the specific region.

9. The gaze guidance degree calculation system according to claim 8, a plurality of the representative points existing in the specific region, and the gaze guidance strength calculation device calculating the gaze guidance strength based on statistical values of positions and gaze attraction strength of the representative points.

10. The gaze guidance degree calculation system according to claim 4, the gaze guidance degree calculation device calculating the gaze guidance directions and the gaze guidance strength corresponding to a plurality of the specific regions of the layout image, and the gaze guidance degree calculation device calculating the gaze guidance directions and gaze attraction strength of the specific regions, which collectively represent the gaze guidance degrees of the specific regions.

* * * * *